US012640842B2

(12) United States Patent
Patel et al.

(10) Patent No.: US 12,640,842 B2
(45) Date of Patent: May 26, 2026

(54) COMMUNICATION TECHNIQUES APPLYING LOW-DENSITY PARITY-CHECK CODE BASE GRAPH SELECTION

(71) Applicant: QUALCOMM Incorporated, San Diego, CA (US)

(72) Inventors: Shimman Arvind Patel, San Diego, CA (US); Joseph Binamira Soriaga, San Diego, CA (US); Gabi Sarkis, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/399,274

(22) Filed: Dec. 28, 2023

(65) Prior Publication Data

US 2024/0146453 A1 May 2, 2024

Related U.S. Application Data

(63) Continuation of application No. 16/664,157, filed on Oct. 25, 2019, which is a continuation of application (Continued)

(51) Int. Cl.
*H04L 1/00* (2006.01)
*H04L 1/1812* (2023.01)

(52) U.S. Cl.
CPC .......... *H04L 1/0057* (2013.01); *H04L 1/0009* (2013.01); *H04L 1/0041* (2013.01);
(Continued)

(58) Field of Classification Search
CPC ... H04L 1/0041; H04L 1/0045; H04L 1/0057; H04L 1/0068; H04L 1/0071; H04L 1/0009; H04L 1/0046; H04L 1/1819
See application file for complete search history.

(56) References Cited

U.S. PATENT DOCUMENTS

| 5,583,500 A | 12/1996 | Allen et al. |
| 5,844,918 A | 12/1998 | Kato |

(Continued)

FOREIGN PATENT DOCUMENTS

| CN | 1399829 A | 2/2003 |
| CN | 1713530 A | 12/2005 |

(Continued)

OTHER PUBLICATIONS

EPO Communication Under Rule 71(3) EPC for Application No. 18735108.5 , mailing date of Jan. 4, 2024.

(Continued)

*Primary Examiner* — Shelly A Chase
(74) *Attorney, Agent, or Firm* — QUALCOMM Incorporated

(57) ABSTRACT

Certain aspects of the present disclosure generally relate to techniques for selecting a base graph to be used for wireless communications. Selection can be based on a variety of factors. A base graph can be used to derive a low-density parity-check (LDPC) code used for encoding a retransmission of an original transmission. An exemplary method generally includes selecting, based on a modulation and coding scheme (MCS) and a resource allocation (RA) for transmitting a codeword, a base graph (BG), from which to derive a low density parity check (LDPC) code for use in encoding data bits in the codeword (e.g., encoding data bits of a bitstream such that some redundant bits are included in the codeword), encoding the data bits to generate the codeword using the LDPC code derived from the selected BG, and transmitting the codeword using the MCS via resources of the RA.

12 Claims, 16 Drawing Sheets

Related U.S. Application Data

No. PCT/US2018/040507, filed on Jun. 30, 2018, which is a continuation of application No. 16/023, 807, filed on Jun. 29, 2018, now abandoned.

(60) Provisional application No. 62/529,765, filed on Jul. 7, 2017.

(52) U.S. Cl.
CPC .......... *H04L 1/0046* (2013.01); *H04L 1/0068* (2013.01); *H04L 1/1819* (2013.01)

(56) References Cited

U.S. PATENT DOCUMENTS

| | | | |
|---|---|---|---|
| 6,438,724 B1 | 8/2002 | Cox et al. |
| 6,633,865 B1 | 10/2003 | Liao |
| 6,674,768 B1 | 1/2004 | Okamura |
| 6,854,082 B1 | 2/2005 | Rhee |
| 6,931,581 B1 | 8/2005 | Cassiday et al. |
| 6,961,388 B2 | 11/2005 | Ling et al. |
| 6,961,888 B2 | 11/2005 | Jin et al. |
| 7,133,853 B2 | 11/2006 | Richardson et al. |
| 7,222,284 B2 | 5/2007 | Stolpman |
| 7,231,557 B2 | 6/2007 | Jin et al. |
| 7,237,171 B2 | 6/2007 | Richardson |
| 7,237,181 B2 | 6/2007 | Richardson |
| 7,493,551 B2 | 2/2009 | Berens et al. |
| 7,526,717 B2 | 4/2009 | Kyung et al. |
| 7,552,097 B2 | 6/2009 | Richardson et al. |
| 7,571,372 B1 | 8/2009 | Burd et al. |
| 7,581,159 B2 | 8/2009 | Hocevar |
| 7,627,801 B2 | 12/2009 | Jin et al. |
| 7,685,495 B2 | 3/2010 | Bhushan |
| 7,747,934 B2 | 6/2010 | Livshitz |
| 7,793,194 B2 | 9/2010 | Seo et al. |
| 7,840,880 B1 | 11/2010 | Bain |
| 7,979,784 B2 | 7/2011 | Shao et al. |
| 7,986,622 B2 | 7/2011 | Frazier et al. |
| 8,006,162 B2 | 8/2011 | Choi et al. |
| 8,117,516 B2 | 2/2012 | Kim et al. |
| 8,132,072 B2 | 3/2012 | El-Khamy et al. |
| 8,149,948 B2 | 4/2012 | Song et al. |
| 8,151,157 B2 | 4/2012 | Lee et al. |
| 8,218,675 B2 | 7/2012 | Kim et al. |
| 8,261,155 B2 | 9/2012 | Richardson et al. |
| 8,271,846 B2 | 9/2012 | Myung et al. |
| 8,356,227 B2 | 1/2013 | Chung et al. |
| 8,392,789 B2 | 3/2013 | Biscondi et al. |
| 8,418,015 B2 | 4/2013 | Cao et al. |
| 8,433,984 B2 | 4/2013 | Khandekar et al. |
| 8,453,030 B2 | 5/2013 | Richardson et al. |
| 8,473,821 B2 | 6/2013 | Taghavi et al. |
| 8,484,545 B2 | 7/2013 | McLaughlin et al. |
| 8,495,450 B2 | 7/2013 | Abu-Surra et al. |
| 8,495,459 B2 | 7/2013 | Myung et al. |
| 8,516,334 B2 | 8/2013 | Xu et al. |
| 8,578,249 B2 | 11/2013 | Khandekar et al. |
| 8,601,345 B1 | 12/2013 | Huang |
| 8,601,352 B1 | 12/2013 | Anholt et al. |
| 8,650,457 B1 | 2/2014 | Yeo |
| 8,687,751 B1 | 4/2014 | Lee et al. |
| 8,751,902 B2 | 6/2014 | Jin et al. |
| 8,892,979 B2 | 11/2014 | Richardson et al. |
| 9,214,960 B2 | 12/2015 | Jeong et al. |
| 9,306,601 B2 | 4/2016 | Richardson |
| 9,325,347 B1 | 4/2016 | Graumann et al. |
| 9,362,956 B2 | 6/2016 | Mahdavifar et al. |
| 9,479,375 B1 | 10/2016 | Ankarali et al. |
| 9,602,133 B1 | 3/2017 | Graumann et al. |
| 9,667,381 B2 | 5/2017 | Jeong et al. |
| 9,692,451 B2 | 6/2017 | Vasista Srinivasan Ranganathan et al. |
| 9,742,439 B1 | 8/2017 | Graumann |
| 9,774,893 B2 | 9/2017 | Moon et al. |

| | | | |
|---|---|---|---|
| 9,917,675 B2 | 3/2018 | Kudekar et al. |
| 10,051,333 B2 | 8/2018 | Moon et al. |
| 10,075,266 B2 | 9/2018 | Luo et al. |
| 10,177,787 B1 | 1/2019 | Danjean et al. |
| 10,291,354 B2 | 5/2019 | Richardson et al. |
| 10,291,359 B2 | 5/2019 | Xu et al. |
| 10,312,919 B2 | 6/2019 | Mazumder |
| 10,312,939 B2 | 6/2019 | Richardson et al. |
| 10,313,057 B2 | 6/2019 | Lin et al. |
| 10,340,949 B2 | 7/2019 | Soriaga et al. |
| 10,348,451 B2 | 7/2019 | Kudekar et al. |
| 10,355,822 B2 | 7/2019 | Patel et al. |
| 10,432,219 B2 | 10/2019 | Zheng et al. |
| 10,454,499 B2 | 10/2019 | Richardson et al. |
| 10,469,104 B2 | 11/2019 | Kudekar et al. |
| 10,516,417 B2 | 12/2019 | Shen et al. |
| 10,560,118 B2 | 2/2020 | Soriaga et al. |
| 10,574,389 B2 | 2/2020 | Kim et al. |
| 10,644,836 B2 | 5/2020 | Kudekar et al. |
| 10,659,079 B2 | 5/2020 | Hsu et al. |
| 10,680,646 B2 | 6/2020 | Richardson |
| 10,735,134 B2 | 8/2020 | Soriaga et al. |
| 10,735,138 B2 | 8/2020 | Kalachev et al. |
| 10,784,901 B2 | 9/2020 | Kudekar et al. |
| 11,025,276 B2 | 6/2021 | Richardson et al. |
| 11,031,953 B2 | 6/2021 | Richardson et al. |
| 11,032,026 B2 | 6/2021 | Richardson et al. |
| 11,043,966 B2 | 6/2021 | Richardson et al. |
| 11,239,860 B2 | 2/2022 | Kudekar et al. |
| 11,277,151 B2 | 3/2022 | Soriaga et al. |
| 11,496,154 B2 | 11/2022 | Richardson |
| 11,671,120 B2 | 6/2023 | Kudekar |
| 11,683,051 B2 | 6/2023 | Li et al. |
| 11,791,845 B2 | 10/2023 | Ahn et al. |
| 11,831,332 B2 | 11/2023 | Richardson et al. |
| RE50,437 E | 5/2025 | Richardson et al. |
| 2002/0147954 A1 | 10/2002 | Shea |
| 2003/0033575 A1 | 2/2003 | Richardson et al. |
| 2003/0053435 A1 | 3/2003 | Sindhushayana et al. |
| 2003/0123409 A1 | 7/2003 | Kwak et al. |
| 2003/0172342 A1 | 9/2003 | Elzur |
| 2004/0098659 A1 | 5/2004 | Bjerke et al. |
| 2004/0187129 A1 | 9/2004 | Richardson |
| 2004/0262376 A1 | 12/2004 | Mezard et al. |
| 2005/0050435 A1 | 3/2005 | Kyung et al. |
| 2005/0078765 A1 | 4/2005 | Jeong et al. |
| 2005/0149842 A1 | 7/2005 | Kyung et al. |
| 2005/0246617 A1 | 11/2005 | Kyung et al. |
| 2005/0283707 A1 | 12/2005 | Sharon et al. |
| 2005/0283708 A1 | 12/2005 | Kyung et al. |
| 2006/0020868 A1 | 1/2006 | Richardson et al. |
| 2006/0020872 A1 | 1/2006 | Richardson et al. |
| 2006/0026486 A1 | 2/2006 | Richardson et al. |
| 2006/0036925 A1 | 2/2006 | Kyung et al. |
| 2006/0156199 A1 | 7/2006 | Palanki et al. |
| 2006/0184855 A1 | 8/2006 | Wang et al. |
| 2006/0274687 A1 | 12/2006 | Kim |
| 2006/0294445 A1 | 12/2006 | Divsalar et al. |
| 2007/0011568 A1 | 1/2007 | Hocevar |
| 2007/0022362 A1 | 1/2007 | Yue et al. |
| 2007/0089025 A1 | 4/2007 | Hong et al. |
| 2007/0101243 A1 | 5/2007 | Kim et al. |
| 2007/0113147 A1 | 5/2007 | Hong et al. |
| 2007/0113148 A1 | 5/2007 | Hong et al. |
| 2007/0136636 A1 | 6/2007 | Tsai et al. |
| 2007/0271496 A1 | 11/2007 | Krouk et al. |
| 2008/0059862 A1 | 3/2008 | Kyung et al. |
| 2008/0062975 A1 | 3/2008 | Mes et al. |
| 2008/0126916 A1 | 5/2008 | Chung et al. |
| 2008/0204286 A1 | 8/2008 | Kose |
| 2008/0207120 A1 | 8/2008 | Kurina et al. |
| 2008/0298334 A1 | 12/2008 | Arviv et al. |
| 2008/0317152 A1 | 12/2008 | Sun et al. |
| 2008/0320353 A1 | 12/2008 | Blankenship et al. |
| 2009/0077456 A1 | 3/2009 | Pi et al. |
| 2009/0113256 A1 | 4/2009 | Radosavljevic et al. |
| 2009/0113276 A1 | 4/2009 | Radosavljevic et al. |
| 2009/0125735 A1 | 5/2009 | Zimmerman |
| 2009/0125780 A1 | 5/2009 | Taylor et al. |

(56)                    References Cited

U.S. PATENT DOCUMENTS

| | | |
|---|---|---|
| 2009/0158129 A1 | 6/2009 | Myung et al. |
| 2009/0204868 A1 | 8/2009 | Park et al. |
| 2009/0217129 A1 | 8/2009 | Myung et al. |
| 2009/0259915 A1 | 10/2009 | Livshitz et al. |
| 2009/0300461 A1 | 12/2009 | Shor et al. |
| 2010/0077275 A1 | 3/2010 | Yu et al. |
| 2010/0107033 A1 | 4/2010 | Kuri et al. |
| 2010/0153819 A1 | 6/2010 | Ueng et al. |
| 2010/0185926 A1 | 7/2010 | Lawson et al. |
| 2010/0199153 A1 | 8/2010 | Okamura et al. |
| 2010/0211844 A1 | 8/2010 | Yuda et al. |
| 2010/0257425 A1 | 10/2010 | Yue et al. |
| 2010/0275089 A1 | 10/2010 | Mow et al. |
| 2010/0275090 A1 | 10/2010 | Kuri et al. |
| 2010/0287438 A1 | 11/2010 | Lakkis |
| 2010/0325511 A1 | 12/2010 | Oh et al. |
| 2011/0066916 A1 | 3/2011 | Abu-Surra et al. |
| 2011/0096862 A1 | 4/2011 | Kuri et al. |
| 2011/0126072 A1 | 5/2011 | Yoshimoto et al. |
| 2011/0161772 A1 | 6/2011 | Yoshii et al. |
| 2011/0170015 A1 | 7/2011 | Kim et al. |
| 2011/0202820 A1 | 8/2011 | Eroz et al. |
| 2012/0084625 A1 | 4/2012 | Pisek et al. |
| 2012/0166917 A1 | 6/2012 | El-Khamy et al. |
| 2012/0240001 A1 | 9/2012 | Abu-Surra et al. |
| 2012/0317461 A1 | 12/2012 | Hwang et al. |
| 2013/0031438 A1 | 1/2013 | Hu et al. |
| 2013/0051556 A1 | 2/2013 | Myung et al. |
| 2013/0086445 A1 | 4/2013 | Yedidia et al. |
| 2013/0117344 A1 | 5/2013 | Gross et al. |
| 2013/0272378 A1 | 10/2013 | Sole Rojals et al. |
| 2014/0003533 A1 | 1/2014 | He et al. |
| 2014/0019820 A1 | 1/2014 | Vardy et al. |
| 2014/0040214 A1 | 2/2014 | Ma |
| 2014/0068375 A1 | 3/2014 | Eroz et al. |
| 2014/0101116 A1 | 4/2014 | Alnafoosi et al. |
| 2014/0173376 A1 | 6/2014 | Jeong et al. |
| 2014/0201592 A1 | 7/2014 | Shen et al. |
| 2014/0223254 A1 | 8/2014 | Pisek |
| 2014/0229788 A1 | 8/2014 | Richardson |
| 2014/0304574 A1 | 10/2014 | Seo et al. |
| 2014/0365842 A1 | 12/2014 | Li et al. |
| 2014/0365844 A1 | 12/2014 | Kliger et al. |
| 2014/0365845 A1 | 12/2014 | Pantelias et al. |
| 2015/0120798 A1 | 4/2015 | Jeong et al. |
| 2015/0178149 A1 | 6/2015 | Cai et al. |
| 2015/0188666 A1 | 7/2015 | Mahdavifar et al. |
| 2015/0222295 A1 | 8/2015 | Li et al. |
| 2015/0229337 A1 | 8/2015 | Alhussien et al. |
| 2015/0249473 A1 | 9/2015 | Li et al. |
| 2015/0263767 A1 | 9/2015 | Shin et al. |
| 2015/0293716 A1 | 10/2015 | Jiang et al. |
| 2015/0334700 A1 | 11/2015 | Tsai |
| 2015/0381208 A1 | 12/2015 | Li et al. |
| 2016/0012465 A1 | 1/2016 | Sharp |
| 2016/0013810 A1 | 1/2016 | Gross et al. |
| 2016/0013931 A1 | 1/2016 | Pisek et al. |
| 2016/0020783 A1 | 1/2016 | Yang et al. |
| 2016/0043745 A1 | 2/2016 | Vojcic et al. |
| 2016/0087648 A1 | 3/2016 | Korb et al. |
| 2016/0134304 A1 | 5/2016 | Shinohara et al. |
| 2016/0164537 A1 | 6/2016 | Pisek et al. |
| 2016/0164629 A1 | 6/2016 | Ahn et al. |
| 2016/0173132 A1 | 6/2016 | Cho |
| 2016/0183187 A1 | 6/2016 | Park |
| 2016/0197701 A1 | 7/2016 | Kim |
| 2016/0218750 A1 | 7/2016 | Ma |
| 2016/0309482 A1 | 10/2016 | Verma et al. |
| 2016/0337083 A1 | 11/2016 | Englert et al. |
| 2016/0380763 A1 | 12/2016 | Ahn et al. |
| 2017/0031599 A1 | 2/2017 | Bowman et al. |
| 2017/0047947 A1 | 2/2017 | Hong et al. |
| 2017/0063493 A1 | 3/2017 | Mundhada et al. |
| 2017/0075754 A1 | 3/2017 | Wang |
| 2017/0187489 A1 | 6/2017 | Myung et al. |
| 2017/0222663 A1 | 8/2017 | Parthasarathy et al. |
| 2017/0230149 A1 | 8/2017 | Wang et al. |
| 2017/0250712 A1 | 8/2017 | Chiu et al. |
| 2017/0353267 A1 | 12/2017 | Kudekar et al. |
| 2018/0007712 A1 | 1/2018 | Lou et al. |
| 2018/0131392 A1 | 5/2018 | Fisher-Jeffes et al. |
| 2018/0152205 A1 | 5/2018 | Kim et al. |
| 2018/0212628 A1 | 7/2018 | Chen et al. |
| 2018/0226992 A1 | 8/2018 | Panteleev et al. |
| 2018/0278267 A1 | 9/2018 | Lee et al. |
| 2018/0331698 A1 | 11/2018 | Lee et al. |
| 2018/0367245 A1 | 12/2018 | Soriaga et al. |
| 2018/0367253 A1 | 12/2018 | Nammi et al. |
| 2019/0068318 A1 | 2/2019 | Marinier et al. |
| 2019/0181884 A1 | 6/2019 | Sun et al. |
| 2019/0215020 A1* | 7/2019 | Shinohara ............ H04L 1/0045 |
| 2019/0260507 A1 | 8/2019 | Lin et al. |
| 2019/0334652 A1 | 10/2019 | Myung et al. |
| 2019/0394000 A1 | 12/2019 | Kim et al. |
| 2020/0007159 A1 | 1/2020 | Jin et al. |
| 2020/0028523 A1 | 1/2020 | Li et al. |
| 2020/0044665 A1 | 2/2020 | Zheng et al. |
| 2020/0059317 A1 | 2/2020 | Patel et al. |
| 2020/0067641 A1 | 2/2020 | Ma et al. |
| 2020/0162109 A1 | 5/2020 | Zhang et al. |
| 2020/0235759 A1 | 7/2020 | Ye et al. |
| 2020/0235854 A1 | 7/2020 | Xu et al. |
| 2020/0322085 A1 | 10/2020 | Kudekar et al. |
| 2020/0404069 A1 | 12/2020 | Li et al. |
| 2021/0281359 A1 | 9/2021 | Xu |
| 2022/0224356 A1 | 7/2022 | Kudekar et al. |
| 2023/0327683 A1 | 10/2023 | Kudekar et al. |
| 2023/0421177 A1 | 12/2023 | Myung et al. |
| 2024/0063826 A1 | 2/2024 | Ahn et al. |
| 2025/0112644 A1 | 4/2025 | Kudekar et al. |
| 2025/0167920 A1 | 5/2025 | Patel et al. |

FOREIGN PATENT DOCUMENTS

| | | |
|---|---|---|
| CN | 1780199 A | 5/2006 |
| CN | 1868145 A | 11/2006 |
| CN | 1953335 A | 4/2007 |
| CN | 1960188 A | 5/2007 |
| CN | 101019328 A | 8/2007 |
| CN | 101047387 A | 10/2007 |
| CN | 101076946 A | 11/2007 |
| CN | 101141133 A | 3/2008 |
| CN | 101188428 A | 5/2008 |
| CN | 101217337 A | 7/2008 |
| CN | 101645763 A | 2/2010 |
| CN | 101682381 A | 3/2010 |
| CN | 101826878 A | 9/2010 |
| CN | 102017426 A | 4/2011 |
| CN | 102340378 A | 2/2012 |
| CN | 102437858 A | 5/2012 |
| CN | 102474386 A | 5/2012 |
| CN | 102546122 A | 7/2012 |
| CN | 102571105 A | 7/2012 |
| CN | 102651652 A | 8/2012 |
| CN | 102783206 A | 11/2012 |
| CN | 103152056 A | 6/2013 |
| CN | 103188044 A | 7/2013 |
| CN | 103281166 A | 9/2013 |
| CN | 103441816 A | 12/2013 |
| CN | 103636130 A | 3/2014 |
| CN | 103716130 A | 4/2014 |
| CN | 103731160 A | 4/2014 |
| CN | 103746708 A | 4/2014 |
| CN | 103780329 A | 5/2014 |
| CN | 103905152 A | 7/2014 |
| CN | 104202126 A | 12/2014 |
| CN | 105227189 A | 1/2016 |
| CN | 105284053 A | 1/2016 |
| CN | 105306165 A | 2/2016 |
| CN | 105337696 A | 2/2016 |
| CN | 106341138 A | 1/2017 |
| CN | 107733442 A | 2/2018 |
| CN | 109150191 A | 1/2019 |
| EP | 1589663 A1 | 10/2005 |

(56) References Cited

FOREIGN PATENT DOCUMENTS

| | | | |
|---|---|---|---|
| EP | 1601109 | A2 | 11/2005 |
| EP | 1724932 | A1 | 11/2006 |
| EP | 2091171 | A2 | 8/2009 |
| EP | 2096760 | A1 | 9/2009 |
| EP | 2518923 | A1 | 10/2012 |
| EP | 2899912 | A1 | 7/2015 |
| EP | 3046259 | A1 | 7/2016 |
| EP | 3226422 | A1 | 10/2017 |
| EP | 3264611 | A1 | 1/2018 |
| EP | 2091171 | B1 | 8/2018 |
| JP | H07288479 | A | 10/1995 |
| JP | 2007507156 | A | 3/2007 |
| JP | 2009081577 | A | 4/2009 |
| JP | 2010537460 | A | 12/2010 |
| JP | 2011512106 | A | 4/2011 |
| JP | 2011514049 | A | 4/2011 |
| JP | 2016518035 | A | 6/2016 |
| KR | 100833515 | B1 | 5/2008 |
| KR | 20090092197 | A | 8/2009 |
| KR | 20090130176 | A | 12/2009 |
| KR | 101157246 | B1 | 6/2012 |
| KR | 20150034561 | A | 4/2015 |
| KR | 101524869 | B1 | 6/2015 |
| KR | 101598754 | B1 | 3/2016 |
| KR | 20170053589 | A | 5/2017 |
| RU | 2520405 | C2 | 6/2014 |
| RU | 2520406 | C2 | 6/2014 |
| SG | 11201905916 | S | 8/2019 |
| TW | 427076 | B | 3/2001 |
| TW | 1272777 | B | 2/2007 |
| TW | 200711359 | A | 3/2007 |
| WO | 2002062002 | | 8/2002 |
| WO | 2006124428 | A2 | 11/2006 |
| WO | 2008052202 | A1 | 5/2008 |
| WO | 2008092040 | | 7/2008 |
| WO | 2008112625 | | 9/2008 |
| WO | 2009005264 | A1 | 1/2009 |
| WO | 2009011134 | A1 | 1/2009 |
| WO | 2009107990 | A2 | 9/2009 |
| WO | 2012064869 | | 5/2012 |
| WO | 2014117836 | A1 | 8/2014 |
| WO | 2014127129 | A1 | 8/2014 |
| WO | 2014127140 | A1 | 8/2014 |
| WO | 2015054268 | A1 | 4/2015 |
| WO | 2015139297 | A1 | 9/2015 |
| WO | 2017091244 | A1 | 6/2017 |
| WO | 2017092693 | A1 | 6/2017 |
| WO | WO-2017119922 | A1 * | 7/2017 ............... H04L 1/00 |
| WO | 2017197267 | | 11/2017 |
| WO | 2017209837 | A1 | 12/2017 |
| WO | 2017218665 | | 12/2017 |
| WO | 2018029633 | A1 | 2/2018 |
| WO | 2018030927 | A1 | 2/2018 |
| WO | 2018050062 | A1 | 3/2018 |
| WO | 2018127196 | A1 | 7/2018 |
| WO | 2018128560 | A1 | 7/2018 |
| WO | 2018144251 | | 8/2018 |
| WO | 2018144560 | A1 | 8/2018 |
| WO | 2018201553 | A1 | 11/2018 |
| WO | 2018201609 | A1 | 11/2018 |
| WO | 2018209035 | | 11/2018 |
| WO | 2018218471 | A1 | 12/2018 |
| WO | 2018227133 | | 12/2018 |

OTHER PUBLICATIONS

Wang H., et al., "On the LLR Criterion Based Shortening Design for LDPC Codes", Proc. 2016 Annual Conference on Information Science and Systems (CISS), IEEE, Mar. 16, 2016, pp. 1-6, XP032895850.

ZTE, et al., "Compact LDPC Design for eMBB", 3GPP Draft, 3GPP TSG RAN WG1 AH NR Meeting, R1-1700247 Compact LDPC Design for EMBB_Final, 3rd Generation Partnership Project (3GPP), Mobile Competence Centre, 650, Route Des Lucioles, F-06921 Sophia-Antipolis Cedex, France, vol. RAN WG1. No. Spokane, USA, Jan. 16, 2017-Jan. 20, 2017 Jan. 10, 2017 (Jan. 10, 2017), XP051202750, pp. 1-16, p. 1-p. 13.

ZTE: "NR LDPC Design", 3GPP TSG RAN WG1 Meeting #89, 3GPP Draft; R1-1709289, NR LDPC Design, 3rd Generation Partnership Project (3GPP), Mobile Competence Centre; 650, Route Des Lucioles; F-06921, Sophia-Antipolis Cedex; France, vol. RAN WG1, No. Hangzhou, China; May 15, 2017-May 19, 2017, May 16, 2017 (May 16, 2017), XP051285041, pp. 1-12, the whole document.

ZTE: "Structured LDPC Coding with Rate Matching", 3GPP TSG RAN WG1 LTE Ad Hoc Meeting, 3GPP Draft; R1-060115 Structured LDPC Coding with Rate Matching, 3rd Generation Partnership Project (3GPP), Mobile Competence Centre; 650, Route Des Lucioles; F-06921 Sophia-Antipolis Cedex; France, vol. RAN WG1, No. Helsinki, Finland; Jan. 23, 2006-Jan 25, 2006, Jan. 19, 2006, 13 Pages, XP050950962, p. 7.

Mediatek Inc: "Multi-Codebook Embedded Compact QC-LDPC Designs", 3GPP TSG-RAN WG1 NR, R1-1706175, Apr. 4, 2017, XP051252463, Retrieved from the Internet: URL: http://www.3gpp.org/ftp/tsg_ran/WG1_RL1/TSGR1_88b/Docs/, 14 pages.

Myung S., et al., "Extension of Quasi-cyclic LDPC Codes by Lifting," PROC., IEEE International Symposium on Information Theory, ISIT 2005, Adelaide, Australia, Sep. 4, 2005 (Sep. 4, 2005), -Sep. 9, 2005 (Sep. 9, 2005), pp. 2305-2309, XP010845965, ISBN: 978-0-7803-9151-2.

Myung S., et al., "Lifting Methods for Quasi-Cyclic LDPC Codes", IEEE Communications Letters, IEEE Service Center, Piscataway, NJ, US, (Jun. 1, 2006) Jun. 2006, vol. 10, No. 6, pp. 489-491, DOI: 10.1109/LCOMM.2006.1638625, ISSN 1089-7798.

Nguyen T.V., et al., "The Design of Rate-Compatible Protograph LDPC Codes", IEEE Transactions on Communications, Oct. 1, 2012, vol. 60, No. 10, XP011469171, ISSN: 0090-6778, DOI: 10.1109/TCOMM.2012.081012.110010, pp. 2841-2850.

Niu K., et al., "CRC-Aided Decoding of Polar Codes," IEEE Communications Letters, Oct. 2012, vol. 16, No. 10, pp. 1668-1671.

Nokia, et al., "Alcatel-Lucent Shanghai Bell Performance and Complexity of Turbo, LDPC and Polar Codes", 3GPP TSG-RAN WG1 #84bis, R1-162897, Busan, Korea, Apr. 11-15, 2016, 6 Pages.

Nokia et al., "LDPC Design for eMBB", 3GPP Draft; R1-1705857_ LDPC Design for EMBB, 3rd Generation Partnership Project (3GPP), Mobile Competence Centre; 650, Route Des Lucioles; F-06921 Sophia-Antipolis Cedex; France, vol. RAN WG1, No. Spokane, WA, USA; Apr. 3, 2017-Apr. 7, 2017 Mar. 24, 2017, XP051250965, Retrieved from the Internet: URL: http://www.3gpp.org/ftp/tsg_ran/ WG1_RL1/TSGR1_88b/Docs/ [retrieved on Mar. 24, 2017], 8 pages.

Nokia, et al., "LDPC Design for eMBB Data", 3GPP TSG-RAN WG1#NR Ad-Hoc meeting, R1-1701028_LDPC Design for EMBB, 3rd Generation Partnership Project, Mobile Competence Centre; 650, Route Des Lucioles; F-06921 Sophia-Antipolis Cedex; France, vol. RAN WG1, No. Spokane, U.S.A., Jan. 16, 2017-Jan. 20, 2017, Jan. 16, 2017, 13 Pages, XP051208543.

Nokia, et al., "R1-1701028_PCM_Large_Blocks," Jan. 9, 2017 (Sep. 1, 2017), pp. 1-1, XP055847852, Retrieved from the Internet: URL: https://www.3gpp.org/ftp/tsg_ran/WG1_RL1/TSGR1_AH/ NR_AH_1701/Docs/ [retrieved on Oct. 5, 2021].

Nokia, et al., "WF on Candidate LDPC Base Matrices" [online], 3GPP Draft, 3GPP TSG RAN WG1 Meeting #89, R1-1709751, Hangzhou, China, May 15-19, 2017, 34 Pages, Retrieved from the Internet: URL: http://www.3gpp.org/ftp/tsg_ran/WG1_RL1/TSGR1_ 89/Docs/R1-1709751.zip.

NOKIA: "Rate Matching for LDPC" [online], 3GPP TSG RAN WG1 NR Ad-Hoc#2, R1-1711536, Jun. 19, 2017, 5 Pages, Internet URL: http://www.3gpp.org/ftp/tsg_ran/WG1_RL1/TSGR1_AH/NR_ AH_1706/Docs/R1-1711536.zip. (In particular, refer to Section 2).

NOKIA: "Structured LDPC Code Design," 11-04-1362-00-000n-structured-ldpc-code-design, IEEE Draft, 11-04-1362-00-000N-Structured-LDPC-Code-Design, IEEE 802.11-04/1362r0, IEEE-SA Mentor, Piscataway, NJ, USA, vol. 802.11n, Nov. 5, 2004 (Nov. 5, 2004), pp. 1-11, XP017690013.

(56) References Cited

OTHER PUBLICATIONS

Oh M., et al., "LDPC Coding for OFDMA PHY", IEEE C802.16e-04/487r3, IEEE Internet http://grouper.ieee.org/, Nov. 2004, (Nov. 9, 2004), pp. 0-9.

Qualcomm Incorporated: "LDPC Codes—HARQ, Rate", 3GPP TSG-RAN WG1 #84b, 3GPP Draft; R1-162209 LDPC_Ratecompatibility_Highleveldesign, 3rd Generation Partnership Project (3GPP), Mobile Competence Centre, 650, Route Des Lucioles; F-06921 Sophia-Antipolis Cedex; France, vol. RAN WG1, No. Busan, Korea; Apr. 11, 2016-Apr. 15, 2016, Apr. 2, 2016, 4 Pages, XP051080037, pp. 2, 3.

Qualcomm Incorporated: "LDPC Design Overview", 3GPP TSG-RAN WG1#85, R1-164697, May 2016, pp. 1-5, 20160523-20160527, URL: http://www.3gpp.org/ftp/tsg_ran/WG1_RL1/TSGR1_812/Docs/R1-164697.zip.

Qualcomm Incorporated: "LDPC Rate Compatible Design", 3GPP TSG-RAN WG1 Ad Hoc, R1-1700830_LDPC_Rate_Compatible_Design, 3rd Generation Partnership Project, Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 16, 2017, 19 Pages, XP051208349.

Qualcomm Incorporated: "LDPC Rate Compatible Design" [online], 3GPP TSG-RAN WG1 #89, R1-1709181, May 13, 2017, pp. 1-11, Retrieved from the Internet: URL: http://www.3gpp.org/ftp/tsg_ran/WG1_RL1/TSGR1_89/Docs/ R1-1709181.zip. (In particular, refer to Section 1).

Qualcomm Incorporated: "LDPC Rate Compatible Design Overview", 3GPP Draft, 3GPP TSG-RAN WG1#86bis, R1-1610137_LDPC_RATE_COMPATIBLE_DESIGN, 3rd Generation Partnership Project (3GPP), Mobile Competence Centre, 650, Route Des Lucioles, F-06921, Sophia-Antipolis Cedex, France, vol. RAN WG1. No. Lisbon, Portugal, Oct. 10, 2016-Oct. 14, 2016, Oct. 9, 2016 (Oct. 9, 2016), 27 Pages, XP051150160, p. 1-p. 9.

Qualcomm Incorporated: "LDPC Rate Matching", 3GPP Draft; R1-1708640_LDPC Rate_Matching, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 14, 2017, XP051273827, Retrieved from the Internet: URL: http://www.3gpp.org/ftp/Meetings_3GPP_SYNC/RAN1/Docs/ [retrieved on May 14, 2017], 3 pages.

Qualcomm Incorporated: "LDPC Segmentation", 3GPP Draft, 3GPP TSG-RAN WG1#89ah, R1-1711211, LDPC Segmentation, 3rd Generation Partnership Project (3GPP), Mobile Competence Centre, 650, Route Des Lucioles, F-06921, Sophia-Antipolis Cedex, France, vol. RAN WG1, No. Qingdao, China; Jun. 27, 2017-Jun. 30, 2017, Jun. 26, 2017 (Jun. 26, 2017), XP051300410, 6 pages, Sections 1, 3-4. Section 4.

Qualcomm Incorporated: "LDPC Rate Compatible Design" [online], 3GPP Draft, 3GPP TSG-RAN WG1 #89ah, R1-1711213, Qingdao, China, Jun. 27-30, 2017, pp. 1-11.

Qualcomm Incorporated: "Polar Code Design Overview", 3GPP Draft, 3GPP TSG-RAN WG1 #85, R1-164699_POLAR_DESIGN_OVERVIEW, 3rd Generation Partnership Project (3GPP), Mobile Competence Centre, 650, Route Des Lucioles, F-06921 Sophia-Antipolis Cedex, France, vol. RAN WG1, No. Nanjing, China, May 15, 2017-May 19, 2017, May 14, 2016 (May 14, 2016), XP051089936, 3 pages, sections 2-4.

Richardson T., et al., "Design of Low-Density Parity Check Codes for 5G New Radio", IEEE Communications Magazine, Key Technologies for 5G New Radio, vol. 56, No. 3, Mar. 1, 2018, XP055480192, pp. 28-34.

Richardson T., et al., "LDPC Proposal Update", C30-20061218-004, 3GPP2-Drafts, Dec. 18, 2006 (Dec. 18, 2006), pp. 1-30, XP040476671, ftp://ftp.3gpp2.org/TSGC/Working/2007/2007-01-Vancouver/TSG-C-2007-01-Vancouver/WG3/Distribution%202006.12.18/C30-20061218-004_QCOM_LDPC_proposal_update.pdf.

Roth C., et al., "A 15.8 pJ/bit/iter Quasi-Cyclic LDPC Decoder for IEEE 802.11n in 90 nm CMOS," IEEE Asian Solid-State Circuits Conference, Nov. 8-10, 2010, 4 pages, https://ieeexplore.ieee.org/document/5716618.

Sagar G.S.K., et al., "A Layered Decoding Architecture for LDPC Decoder with Low Energy Consumption", GATES Institute of Technology, GiTAM University, Vizag, International Journal of Electronic Signals and Systems, vol. 3, Iss-1, 2013, 11 Pages, ISSN: 2231-5969.

Samsung: "Flexibility of LDPC—Length, Rate and IR-HARQ", 3GPP Draft, 3GPP TSG RAN WG1 #85, R1-164007 3rd Generation Partnership Project (3GPP), Mobile Competence Centre, 650, Route Des Lucioles, F-06921 Sophia-Antipolis Cedex, France, vol. RAN WG1. No. Nanjing, China, May 23, 2016-May 27, 2016 May 14, 2016 (May 14, 2016), XP051090116, 8 Pages, p. 1-p. 3 p. 6.

Samsung: "LDPC Code for BG1", 3GPP TSG RAN WG1 NR#2, R1-1710744, Qingdao, China, Jun. 27-30, 2017, 3 Pages.

Samsung: "LDPC Code for BG2", 3GPP TSG Ran WG1 NR#2, R1-1710745, Qingdao, China, Jun. 27-30, 2017, 3 Pages.

Samsung: "Preliminary Evaluation Results on New Channel Coding Scheme for NR-LDPC Code for High Throughput", 3GPP TSG-RAN WG1#85, R1-164812, May 14, 2016, 17 Pages.

Shea J.M., et al., "Multidimensional Codes", In Wiley Encyclopedia of Telecommunications, vol. 3, pp. 1-26, XP055402230, https://doi.org/10.1002/0471219282.eot342, Apr. 15, 2003, Entirety, the whole document.

Shi L., "Research on Polar Code Characters and its Encoding and Decoding Method", Chinese Master's Theses Full-Text Database, Information Science and Technology, Issue No. 12, Dec. 15, 2015, 76 pages.

Shuyang L., et al., "Design of High Efficient LDPC Encoder in IEEE 802.16e", 4 Pages, Nov. 2, 2012.

Stolte N., "Recursive Codes with the Plotkin-Construction and Their Decoding," (DOI: 10.13140/RG.2.1.1036.6803) https://www.researchgate.net/publication/286929473_Recursive_Codes_with_the_Plotkin-Construction_and_Their_Decoding , May 2003, (Jan. 31, 2001), the whole document, 145 pages.

Stolte N., Rekursive Codes mit der Plotkin-Konstruktion und ihre Decodierung, D17 Darmstadter Dissertation, Jan. 1, 2002, 151 Pages, (in particular, pp. 13-30), XP055241445, Url: http://tuprints.ulb.tu-darmstadt.de/epda/000183/stolte.pdf, Techn. Universitat, Diss., 2002 (Nicht f. d. Austausch)_Darmstadt [retrieved on Jan. 14, 2016].

Surra S.A., et al., "Gigabit Rate Achieving Low-Power LDPC Codes: Design And Architecture", IEEE, Mar. 1, 2011, pp. 1994-1999.

Taiwan Search Report—TW107122776—TIPO—Sep. 6, 2021.

Taiwan Search Report—TW107122776—TIPO—Dec. 13, 2021.

Tal I., et al., "List Decoding of Polar Codes", IEEE Transactions on Information Theory, Institute of Electrical and Electronics Engineers, May 2015, vol. 61, No. 5, pp. 2213-2226.

Tal I., et al., "List Decoding of Polar Codes", International Symposium on Information Theory proceedings, ISIT 2011, St. Petersburg, Russia, Jul. 31-Aug. 5, 2011, May 31, 2012 (May 31, 2012), pp. 1-11, XP055225954, Piscataway, NJ, ISBN: 978-1-4577-0596-0, Retrieved from the Internet: URL: http://arxiv.org/pdf/1206.0050.pdf [retrieved on Nov. 4, 2015] sections II-III.

Trifonov P., "Efficient Design and Decoding of Polar Codes", IEEE Transactions on Communications, IEEE Service Center, Piscataway, NJ, USA, vol. 60, No. 11, Nov. 1, 2012 (Nov. 1, 2012), XP011473857, pp. 3221-3227, ISSN: 0090-6778, DOI: 10.1109/TCOMM.2012.081512.110872.

Trifonov P., et al., "Generalized Concatenated Codes Based on Polar Codes", 8th International Symposium on Wireless Communication Systems, Nov. 6, 2011, XP032090122, pp. 442-446, DOI: 10.1109/ISWCS.2011.6125399, ISBN: 978-1-61284-403-9.

Trifonov P., et al., "FastEncoding of Polar Codes with Reed-Solomon Kernel," IEEE Transactions on Communications, May 2016, pp. 1-8.

Wang T., et al., "Parity-Check-Concatenated Polar Codes", IEEE Communications Letters, IEEE Service Center, Piscataway, NJ, US, vol. 20, No. 12, Dec. 1, 2016, pp. 2342-2345, Sep. 8, 2016,

(56) References Cited

OTHER PUBLICATIONS

XP011636292, ISSN: 1089-7798, DOI: 10.1109/LCOMM.2016. 2607169 [retrieved on Dec. 8, 2016].

Wang Y., et al., "Concatenations of Polar Codes With Outer BCH Codes and Convolutional Codes", 2014 52nd Annual Allerton Conference on Communication, Control, and Computing (Allerton), IEEE, Sep. 30, 2014, XP032731136, pp. 813-819, Sections II-V.

Xie Y., et al., "Design of Rate Compatible Protograph-based LDPC Codes with Mixed Circulants", IEEE, 6th International Symposium on Turbo Codes Iterative Information Processing, Sep. 2010, pp. 434-438.

Xu, R., et al., "High Girth LDPC Coding for OFDMA PHY", C80216e-05_031, IEEE Draft, IEEE 802.16 Broadband Wireless Access Working Group, No. IEEE C802. 16e-05/031, IEEE-SA, Piscataway, NJ USA, vol. 802.16e, Jan. 10, 2005 (Oct. 10, 2005), XP017625511, pp. 1-11, [retrieved on Feb. 15, 2005], Retrieved from the Internet: URL: http://ieee802.org/16.

Yu Q., et al., "Hybrid Parity-Check and CRC Aided SCL Decoding for Polar Codes", 2016 IEEE International Conference on Internet of Things (iThings) and IEEE Green Computing and Communications (GreenCom) and IEEE Cyber, Physical and Social Computing (CPScom) and IEEE Smart Data (SmartData), IEEE, Dec. 15, 2016, XP033093024, Dec. 18, 2016, pp. 711-716, DOI: 10.1109/1Things-Greencom-Cpscom-Smartdata.2016.152.

Zhang Z., et al., "An Efficient 10GBASE-T Ethernet LDPC Decoder Design with Low Error Floors," IEEE Journal of Solid-State Circuits, Apr. 2010, vol. 45 (4), pp. 843-855. Issue: 4, Apr. 2010, https://ieeexplore.ieee.org/document/5437474.

Zhou, H., et al., "Segmented CRC-Aided SC List Polar Decoding", 2016 IEEE 83rd Vehicular Technology Conference (VTC Spring), May 15, 2016 (May 15, 2016), XP032918751, 5 pp. Jul. 7, 2016, Retrieved from the Internet: URL: https://ieeexplore.ieee.org/document/7504469, DOI: 10.1109/VTCSPRING.2016.7504469, [retrieved on Jul. 5, 2016], Sections III, Abstract, Figs. 2, 4, 7.

ZTE Microelectronics: "Consideration on LDPC Design for NR", 3GPP TSG RAN WG1 #87, R1-1611112, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2014, Nov. 13, 2016, XP051175094.

"3rd Generation Partnership Project; Technical Specification Group Radio Access Network; NR; Multiplexing and Channel Coding (Release 15)", 3GPP TS 38.212, V15.3.0 (Sep. 2018), pp. 1-95.

Abbasfar A., et al., "Accumulate Repeat Accumulate Codes", Dec. 2, 2003, XP002585965, Retrieved from the Internet: URL: http://trs-new.jpl.nasa.gov/dspace/bitstream/2014/8047/1/03-3469.pdf [retrieved on Jun. 4, 2010], 6 pages.

Alcatel-Lucent et al., "LDPC Coding Proposal for LBC", 3GPP2 Draft; C30-20070226-002_C30-20070212-034R1_AHLQRZ_LDPC_PROPOSAL_FOR_LBC, Mar. 27, 2007, XP062206073, Retrieved from the Internet: URL: http://ftp.3gpp2.org/TSGC/Working/2007/2007-03-Atlanta/TSG-C-2007-03-Atlanta/WG3/LDPC Ad Hoc Call,Feb. 26, 2007/ pp. 1-27.

Alcatel-Lucent et al., "LDPC Coding Proposal for LBC", 3GPP2-Drafts, 2500 Wilson Boulevard, Suite 300, Arlington, Virginia 22201, USA, Mar. 15, 2007 (Mar. 15, 2007), XP040477608, 32 Pages, p. 1-p. 13, pp. 10-12.

Arikan E., "A Survey of Reed-Muller Codes From Polar Coding Perspective", Information Theory Workshop (ITW), Piscataway, NJ, USA, Jan. 6, 2010, pp. 1-5, XP031703947, ISBN: 978-1-4244-6372-5.

Arikan E., "Channel Polarization: A Method for Constructing Capacity-Achieving Codes for Symmetric Binary-Input Memory-less Channels", IEEE Transactions on Information Theory, IEEE Press, USA, vol. 55, No. 7, Jul. 24, 2008, pp. 1-23, XP080428257, Jul. 20, 2009, ISSN: 0018-9448.

Arikane., "Challenges and some new directions in channel coding," Computer Science, Information Theory, arXiv:1504.03916, Apr. 15, 2015, 11 pages.

Bing L., et al., "Unequal Error Protection Nonbinary LDPC Codes for Bandwidth Efficient Transmission", Signal processing, vol. 27, No. 7, Jul. 7, 2011, 7 Pages.

Chapter II Demand and Amendment under PCT Article 34 dated Jan. 18, 2018, PCT/US2017/035026 (163465WO).

Chen B., et al., "List Viterbi Algorithms for Continuous Transmission", IEEE Transactions on Communications, IEEE Service Center, Piscataway, NJ, USA, vol. 49, No. 5, XP011009921, May 1, 2001 (May 1, 2001), pp. 784-792, ISSN: 0990-6778.

Chen T.Y., et al., "Protograph-based Raptor-Like LDPC Codes with Low Thresholds", IEEE International Conference on Communications, Jun. 10, 2012, DOI: 10.1109/ICC.2012.6363996, ISBN: 978-1-4577-2052-9, pp. 2161-2165.

Chiu M.C., et al., "Reduced-Complexity SCL Decoding of Multi-CRC-Aided Polar Codes", Sep. 28, 2016, XP055384603, pp. 1-9, Retrieved from the Internet: URL:https://arxiv.org/pdf/1609.08813. pdf [retrieved on Jun. 23, 2017], p. 2, left-hand column, paragraph 2, section VI.

Co-pending U.S. Appl. No. 17/334,608, inventors Richardson; Thomas et al., filed May 28, 2021.

Deng X., et al., "Segmented Cyclic Redundancy Check: A DataProtection Scheme for Fast Reading RFID Tag's Memory," IEEE WirelessCommunications and Networking Conference, 2008, pp. 1576-1581.

El-Khamy M., et al., "Binary Polar Codes are Optimized Codes for Bitwise Multistage Decoding", Computer Science, Information Theory, Arxiv.org, Cornell University Library, 201 Olin Library Cornell University Ithaca, NY 14853, Apr. 12, 2016, XP080695103, DOI: 10.1049/EL.2016.0837, 2 pages.

El-Khamy M., et al., "Design of Rate Compatible Structured LDPC Codes for Hybrid ARQ Applications", IEEE, Aug. 1, 2009, vol. 27(6), pp. 965-973.

EP Response Dated Nov. 7, 2023 to the Official Communication EP Application No. 18735108.5, 17 Pages.

Ericsson: "CRC Attachment Point for MAC-is When Transmitting MAC-c PDU", R2-086458, 3GPP TSG-RAN WG2 Meeting #64 , Prague, Czech Republic, Nov. 10-Nov. 14, 2008, Nov. 3, 2008, 2 Pages.

Ericsson: "Implementation and Performance of LDPC Decoder", 3GPP TSG RAN WG1 AH_NR Meeting R1-1700111, Jan. 20, 2017, 8 Pages.

Ericsson: "LPDC Code Performance for High Reliability Use Cases", 3GPP Draft, 3GPP TSG RAN WG1 NR Ad-Hoc#2, R1-1710499 LDPC Code Performance for High Reliability Use Cases, 3rd Generation Partnership Project (3GPP), Mobile Competence Centre, 650, Route Des Lucioles, F-06921 Sophia-Antipolis CE, vol. RAN WG1, No. Qingdao, P.R. China, Jun. 27-2017-Jun. 30, 2017, Jun. 26, 2017 (Jun. 26, 2017), XP051299707, pp. 1-6.

Ericsson: "Design Parameters and Implementation Aspects of LPDC Codes", 3GPP TSG-RAN WG1 #88, R1-1703537, 3rd Generation Partnership Project (3GPP), Mobile Competence Centre, 650, Route Des Lucioles, F-06921 Sophia-Antipolis, vol. RAN WG1, No. Athens, Greece, Feb. 13, 2017-Feb. 17, 2017, Feb. 15, 2017, XP051222070, 9 Pages.

Ericsson: "Performance and Complexity of Per-Segment CRC Attachment Methods", 3GPP TSG-RAN WG1#50, 3GPP Draft, R1-073741, 3rd Generation Partnership Project (3GPP), Mobile Competence Centre, 650, Route Des Lucioles, F-06921, Sophia-Antipolis Cedex, France, vol. RAN WG1, No. Athens, Greece; Aug. 15, 2007 (Aug. 15, 2007), XP050107330, 3 Pages.

Ericsson: "System Information for Low Complexity and Extended Coverage", 3GPP Draft; R1-1708730—Sysinfo for Low Complexity and Ext Coverage, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 7, 2017, XP051263297, 3 pages.

ETSI TR 138 912, V14.0.0, "3rd Generation Partnership Project; Technical Specification Group Radio Access Network; Study on New Radio (NR) Access Technology (Release 14)", 3GPP Standard, Technical Specification, 3GPP TR 38.912, 3rd Generation Partnership Project (3GPP), Mobile Competence Centre, 650, Route Des

(56) References Cited

OTHER PUBLICATIONS

Lucioles, F-06921 Sophia-Antipolis Cedex, France, vol. TSG RAN, No. V14.0.0, Mar. 24, 2017 (Mar. 24, 2017), XP051295707, 77 pages, Abstract.

Guo J., et al., "Multi-CRC Polar Codes and Their Applications", IEEE Communications Letters, IEEE Service Center, Piscataway, NJ, US, vol. 20, No. 2, Feb. 1, 2016 (Feb. 1, 2016), XP011598246, pp. 212-215, ISSN: 1089-7798, DOI: 10. 1109/LCOMM.2015. 2508022, [retrieved on Feb. 8, 2016], Abstract, Sections II, III, IV, Algorithm 1 and step 7- condition 1, Section III, figure 1.

Hashemi S.A., et al., "Partitioned Successive-Cancellation List Decoding of Polar Codes", 2016 IEEE International Conference on Acoustics, Speech and Signal Processing (ICASSP), Mar. 20, 2016, pp. 957-960, https://ieeexplore.ieee.org/stamp/stamp.jsp?tp=arnumber= 7471817, XP032900743, DOI: 10.1109/ICASSP.2016.7471817, [retrieved on May 18, 2016], the whole document.

Huawei, et al., "Details of the Polar Code Design", 3GPP TSG RAN WG1 Meeting #87, R1-1611254, Reno, USA, 3rd Generation, Partnership Project, Mobile Competence Centre, 650, Route Des Lucioles, F-06921 Sophia-Antipolis Cedex, France, vol. RAN WG1, No. Reno, USA, Nov. 10, 2016-Nov. 14, 2016, 15 Pages, Nov. 13, 2016, XP051175235, Nov. 3, 2016.

IEEE: "IEEE Std 802. 16e-2005, Part 16: Air Interface For Fixed and Mobile Broadband Wireless Access Systems," Amendment 2 and Corrigendum 1 to IEEE Std 802.16-2004, Low Density Parity Check code (Optional), IEEE Std 802.16E-2005, Feb. 28, 2006 (Feb. 28, 2006), 6 pages, XP002515198.

"IEEE Standard for Local and Metropolitan Area Networks Part 16: Air Interface for Broadband Wireless Access Systems; IEEE Std 802.16-2009 (Revision of IEEE Std 802.16-2004)", IEEE Standard, IEEE, Piscataway, NJ, USA, May 29, 2009, XP068045637, ISBN: 978-0-7381-5919-5, pp. 1-2082, p. 1057-p. 1061.

IEEE Std 802.16e-2005, "Air Interface For Fixed and Mobile Broadband Wireless Access Systems", Amendment 2 and Corrigendum 1 to IEEE Std 802.16-2004, Feb. 28, 2006, pp. 626-630, XP002515198.

Intel Corporation: "LDPC Code Design for NR", 3GPP TSG RAN WG1 Meeting #85, 3GPP Draft; R1-164183, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 14, 2016 (May 14, 2016), 4 Pages. XP051090075, p. 1-p. 3.

Intel Corporation: "LDPC Coding Chain", 3GPP TSG RAN WG1 Meeting NR-Adhoc#2, R1-1711344, 3rd Generation Partnership Project, Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, pp. 1-6, Jun. 20, 2017, XP051305812.

Interdigital Inc: "Code Block Segmentation for Data Channel", 3GPP Draft; R1-1710958, Code Block Segmentation for Data Channel, 3rd Generation Partnership Project (3GPP), Mobile Competence Centre; 650 Route Des Lucioles; F-06921, Sophia-Antipolis Cedex; France, vol. RAN WG1, No. Qingdao; Jun. 27, 2017-Jun. 30, 2017, Jun. 26, 2017 (Jun. 26, 2017), 4 Pages, XP051300159.

International Search Report and Written Opinion—PCT/US2018/ 040507—ISA/EPO—Oct. 15, 2018.

Jacobsen, N., et al., "Design of Rate-Compatible Irregular LDPC Codes Based on Edge Growth and Parity Splitting", 2007 IEEE 66th Vehicular Technology Conference, Oct. 15, 2007, pp. 1052-1056, DOI: 10.1109/VETECF.2007.228.

Jiang M., et al., "An Improved Variable Length Coding Scheme Using Structured LDPC Codes", Wireless Communications and Signal Processing (WCSP), 2010 International Conference on, IEEE, Piscataway, NJ, USA, Oct. 21, 2010 (Oct. 21, 2010), XP031800170, pp. 1-5, ISBN: 978-1-4244-7556-8, p. 1, right-hand column—p. 4, left-hand column.

Jun L., et al., "A Reduced Latency List Decoding Algorithm for Polar Codes", 2014 IEEE Workshop on Signal Processing Systems (SIPS), Oct. 1, 2014, p. 1-6.

Kalsi A., et al., "A Base Matrix Method to Construct Column Weight 3 Quasi-Cyclic LDPC Codes with High Girth", IEEE, 4 Pages, 20160908.

Keeth, J., (Nokia): 3GPP TSG-RAN WG1 Email (Subject: "[89-24] LDPC Code Base Graph # 1 for NR", Date: Tue, May 23, 2017 09:33:58 +0000), May 23, 2017, 1 Page, Retrieved from the Internet: URL: https://list.etsi.org/scripts/wa.exe?A2=ind1705DL= 3GPP_TSG_RAN_WG1P=R18940u=75177.

Keeth, J., (Nokia): 3GPP TSG-RAN WG1 Email (Subject: "Re: [89-24] LDPC Code Base Graph # 1 for NR", Date: Wed, Jun. 7, 2017 18:17:47 +0000), and The Attachment "Way forward on LDPC designs_clean.docx", Jun. 7, 2017, 58 Pages, Retrieved from the Internet: URL: https://list.etsi.org/scripts/wa.exe?A2=ind1706A L=3GPP_TSG_RAN_WG1P=R3822731.

Lerouxc., et al., "A Semi-Parallel Successive-Cancellation Decoder for Polar Codes," IEEETransactions on Signal Processing, Jan. 2013, vol. 61, No. 2, pp. 1-11.

Li, B., et al., "An Adaptive Successive Cancellation List Decoder for Polar Codes with Cyclic Redundancy Check", IEEE Communications Letters, IEEE Service Center, Piscataway, NJ, US, vol. 16, No. 12, Dec. 1, 2012 (Dec. 1, 2012), XP011478817, pp. 2044-2047, ISSN: 1089-7798, DOI:10.1109/LCOMM.2012.111612.121898, abstract, Section I, III and IV.

Liu J., et al., "Rate-Compatible LDPC Codes with Short Block Lengths Based on Puncturing and Extension Techniques," 2014, pp. 1-20.

Lucas R et al., "Improved Soft-Decision Decoding of Reed-Muller Codes as Generalized Multiple Concatenated Codes", ITG-FACHBERI, vol. 183, VDE-VERLAG, DE, No. 146, Mar. 5, 1998, pp. 137-142.

Ma, F., "Puncturing Schemes for Rate-Compatible LDPC Codes", Chinese Selected Doctoral Dissertations and Master's Theses Full-Text Databases (Master) Information Science and Technology, Oct. 15, 2012 (Dec. 2011), 60 Pages.

Mackay D.J.C., "Good Error-Correcting Codes Based on Very Sparse Matrices," IEEETransactions on Information Theory, Mar. 1999, vol. 45 (2), pp. 399-431.

Mahdavifar H., et al., "On the Construction and Decoding of Concatenated Polar Codes", IEEE International Symposium on Information Theory, Jul. 7, 2013, XP032497043, pp. 952-956, Sections II-IV.

MAHDAVIFARH., et al., "Fast Multi-dimensional Polar Encoding and Decoding," Information Theory and Applications Workshop (ITA), IEEE, 2014, 5 pages.

Mediatek Inc: "A Multi-Codebook Embedded Compact QC-LDPC Design" [online], 3GPP Draft, 3GPP TSG-RAN WG1 NR, Spokane, USA, Apr. 3-7, 2017, R1-1704457, pp. 1-11, Retrieved from the Internet: URL: http://www.3gpp.org/ftp/tsg_ran/WG1_RL1/ TSGR1_88b/Docs/R1-1704457.zip.

Mediatek Inc: "Resolving Polar Code Memory Complexity Issue", 3GPP TSG RAN WG1 Meeting #86bis, R1-1610420, Lisbon, Portugal, Oct. 10, 2016-Oct. 14, 2016, 6 Pages, Oct. 18, 2016.

Xu Y., et al., "Improved Shortening Algorithm for Irregular QC-LDPC Codes Using Known Bits", IEEE Transactions on Consumer Electronics, IEEE Service Center, New York, US, vol. 57, No. 3, Aug. 1, 2011, pp. 1057-1063, XP011386541.

Qualcomm Incorporated: "LDPC Design Considerations", 3GPP TSG-RAN WG1 NR AdHoc, R1-1700831, Spokane, USA, Jan. 16, 2017-2070120, Jan. 10, 2017, pp. 1-20.

Chen T-Y., et al., "Protograph-Based Raptor-Like LDPC Codes", IEEE Transactions on Communications, IEEE Service Center, Piscataway, NJ. USA, vol. 63, No. 5, May 1, 2015, pp. 1522-1532, XP011581513.

He-Guang S., et al., "A Novel Puncturing Scheme for Rate-compatible LDPC Codes", Journal of Electronics Information Technology, Oct. 2011, vol. 33, No. 10, Dec. 31, 2011, pp. 2334-2339.

"IEEE Standard for Local and Metropolitan Area Networks Part 16: Air Interface for Broadband Wireless Access Systems; IEEE Std 802.16-2009 (Revision of IEEE Std 802.16-2004)", IEEE Standard, IEEE, Piscataway, NJ, USA, May 29, 2009, XP068045637, ISBN: 978-0-7381-5919-5, pp. Jan. 2082.

Intel Corporation: "LDPC Code Design for NR", 3GPP TSG RAN WG1 Meeting #85, R1-164183, 3rd Generation Partnership Project

(56)                References Cited

OTHER PUBLICATIONS (3GPP), Mobile Competence Centre, 650, Route Des Lucioles, F-06921 Sophia- Antipolis Cedex, France, vol. Ran WG1, No. Nanjing, China, May 23, 2016-May 27, 2016, May 14, 2016, 4 Pages, XP051090075, The Whole Document.

Zhang B., et al., "Puncturing Schemes for Rate-Compatible Non-binary LDPC Codes", 2011 International Conference On Electronics, Communications and Control (ICECC), Jan. 1, 2011, pp. 2189-2192.

Intel Corporation: "Polar Code Design for NR", 3GPP TSG RAN WG1 Meeting #85, R1-164184, Nanjing, China, May 23-27, 2016, pp. 1-4.

Mediatek Inc: "Discussion on Polar Code Design and Performance", 3GPP TSG RAN WG1 Meeting #85bis, 3GPP Draft; R1-165454 Discussion on Polar Code Design and Performance, 3rd Generation Partnership Project (3GPP), Mobile Competence Centre, 650, Route Des Lucioles ; F-06921 Sophia-Antipolis Cedex, France, vol. Ran WG1, No. Nanjing, China; May 23, 2016-May 27, 2016, May 24, 2016 (May 24, 2016), 7 Pages, XP051104208, the whole document.

Zhang Y., et al., "A Parallel Decoding Algorithm for Short Polar Codes Based on Error Checking and Correcting", The Scientific World Journal, Jul. 23, 2014, pp. 1-14.

ZTE Corporation: Translation of CN Application No. 201610322409. 4, Dated Nov. 11, 2019, 59 pages.

ZTE, et al., "Consideration on Flexibility of LDPC Codes for NR", 3GPP TSG RAN WG1 Meeting #87, R1-1611111, Reno, USA Nov. 14-18, 2016, pp. 1-13.

3GPP: "Re: [89-25] LDPC Code Base Graph #2 for NR" Jayasinghe, Keeth (Nokia—FI/ESpoo) [log in to unmask] Jayasinghe, Keeth (Nokia—FI/Espoo) Thu, Jun. 8, 201711:59:14 +0000 multipart/related, 3GPP_TSG_RAN_WG1 Archives, Jun. 2017, 14 Pages.

Chiu M-C., et al., "Reduced-Complexity SCL Decoding of Multi-CRCAided Polar Codes", arXiv:1609.08813v1, Sep. 28, 2016, pp. 1-9, XP055384603.

Guo Jianfeng et al: "Multi-CRC Polar Codes and Their Applications", IEEE Communications Letters, IEEE Service Center, Piscataway, NJ, US, vol. 20, No. 2, Feb. 1, 2016, pp. 212-215, XP011598246, ISSN: 1089-7798, DOI: 10.1109/LCOMM.2015.2508022.

Li B., et al., "An Adaptive Successive Cancellation List Decoder for Polar Codes with Cyclic Redunancy Check", IEEE Communications Letters, IEEE Service Center, Piscataway, NJ, US, vol. 16, No. 12, Dec. 1, 2012, pp. 1-4, XP011478817, ISSN: 1809-7798, DOI: 10.1109/LCOMM.2012.111612.121898.

Zhaoliu Z., "Research and Design of LDPC Code with Fast Encoding Structure", Huazhong University of Science and Technology Wuhan,, Jul. 15, 2013, 65 Pages.

Zhou H., et al., "Segmented CRC-Aided SC List Polar Decoding", 2016 IEEE 83rd Vehicular Technology Conference (VTC Spring), IEEE, May 15, 2016, 5 Pages, XP032918751, DOI: 10.1109/VTCSPRING.2016.7504469.

* cited by examiner

600

700

800

Variable Nodes 810

Check Nodes  820

800A

1300

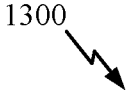

1302

TRANSMIT, BY A TRANSCEIVER CIRCUIT USING ONE OR MORE ANTENNA ELEMENTS IN ELECTRICAL COMMUNICATION WITH THE TRANSCEIVER CIRCUIT, A FIRST CODEWORD TO A USER EQUIPMENT (UE), THE FIRST CODEWORD ENCODED USING A FIRST LOW-DENSITY PARITY-CHECK (LDPC) CODE DERIVED FROM A BASE GRAPH (BG) SELECTED BASED ON A CODE BLOCK SIZE (CBS) AND A FIRST CODE RATE OF THE TRANSMISSION

1304

OBTAIN, BY THE TRANSCEIVER CIRCUIT USING THE ONE OR MORE ANTENNA ELEMENTS, AN INDICATION THAT THE UE DID NOT RECEIVE THE FIRST CODEWORD

1306

SELECT, BY THE PROCESSOR, A SECOND CODE RATE FOR A RETRANSMISSION OF INFORMATION BITS OF THE FIRST CODEWORD, WHEREIN THE SELECTION IS FROM A RESTRICTED SET OF CODE RATES DESIGNED TO ENSURE THE UE SELECTS THE SAME BG TO DECODE THE RETRANSMISSION

1308

RETRANSMIT, BY THE TRANSCEIVER CIRCUIT USING THE ONE OR MORE ANTENNA ELEMENTS, THE INFORMATION BITS IN A SECOND CODEWORD ACCORDING TO THE SELECTED SECOND CODE RATE

FIG. 13

1400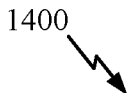

1402

SELECT, BY THE PROCESSOR AND BASED ON A MODULATION AND CODING SCHEME (MCS) AND A RESOURCE ALLOCATION (RA) FOR TRANSMITTING A CODEWORD, A BASE GRAPH (BG) STORED IN SAID MEMORY, FROM WHICH TO DERIVE A LOW DENSITY PARITY CHECK (LDPC) CODE FOR USE IN ENCODING DATA BITS IN THE CODEWORD

1404

ENCODE, BY AN ENCODER CIRCUIT, THE DATA BITS TO GENERATE THE CODEWORD USING THE LDPC CODE DERIVED FROM THE SELECTED BG

1406

TRANSMIT, BY A TRANSCEIVER CIRCUIT, THE CODEWORD USING THE MCS VIA RESOURCES OF THE RA USING ONE OR MORE ANTENNA ELEMENTS IN ELECTRICAL COMMUNICATION WITH THE TRANSCEIVER CIRCUIT

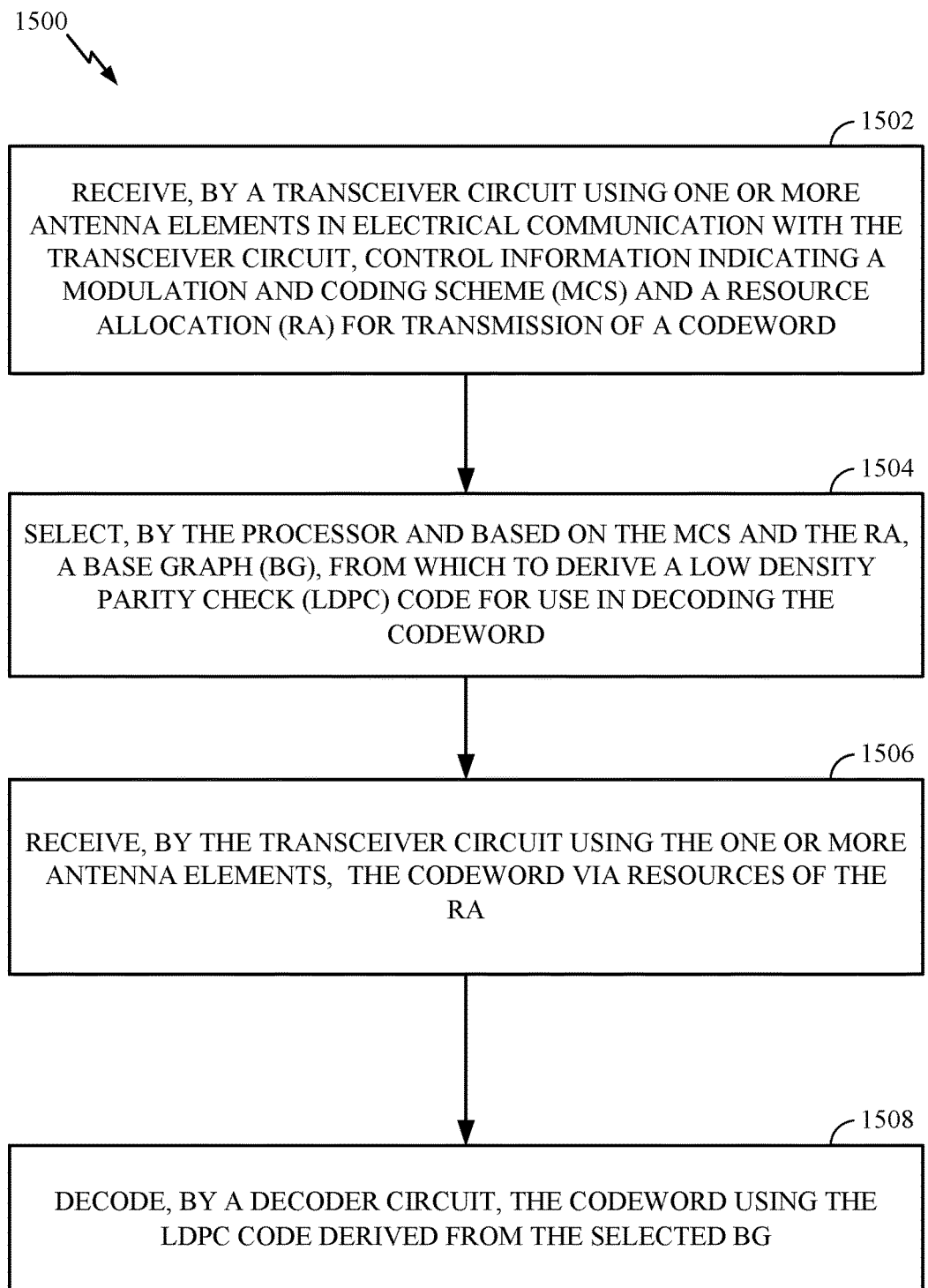

1502

RECEIVE, BY A TRANSCEIVER CIRCUIT USING ONE OR MORE ANTENNA ELEMENTS IN ELECTRICAL COMMUNICATION WITH THE TRANSCEIVER CIRCUIT, CONTROL INFORMATION INDICATING A MODULATION AND CODING SCHEME (MCS) AND A RESOURCE ALLOCATION (RA) FOR TRANSMISSION OF A CODEWORD

1504

SELECT, BY THE PROCESSOR AND BASED ON THE MCS AND THE RA, A BASE GRAPH (BG), FROM WHICH TO DERIVE A LOW DENSITY PARITY CHECK (LDPC) CODE FOR USE IN DECODING THE CODEWORD

1506

RECEIVE, BY THE TRANSCEIVER CIRCUIT USING THE ONE OR MORE ANTENNA ELEMENTS,  THE CODEWORD VIA RESOURCES OF THE RA

1508

DECODE, BY A DECODER CIRCUIT, THE CODEWORD USING THE LDPC CODE DERIVED FROM THE SELECTED BG

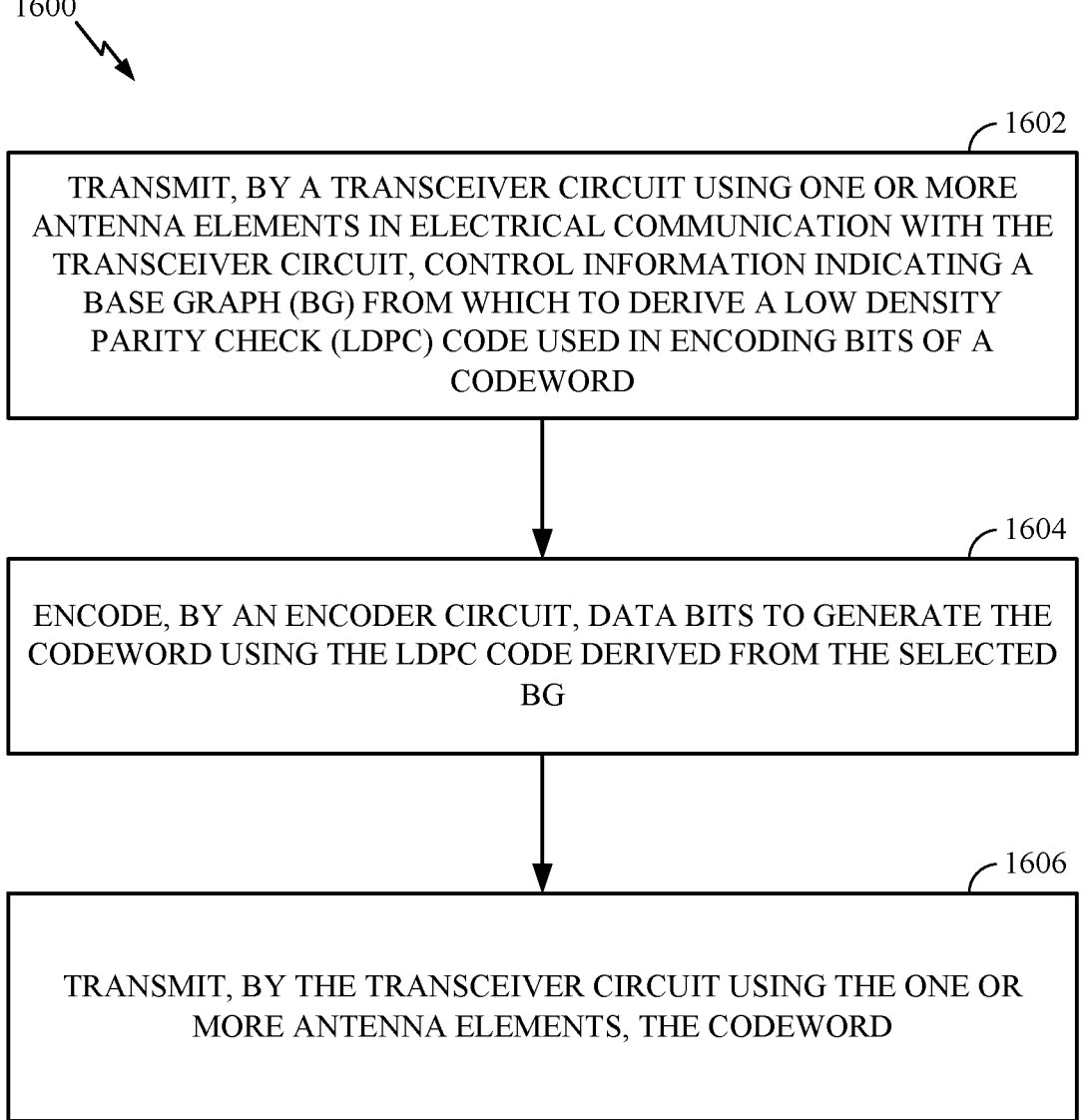

1602

TRANSMIT, BY A TRANSCEIVER CIRCUIT USING ONE OR MORE ANTENNA ELEMENTS IN ELECTRICAL COMMUNICATION WITH THE TRANSCEIVER CIRCUIT, CONTROL INFORMATION INDICATING A BASE GRAPH (BG) FROM WHICH TO DERIVE A LOW DENSITY PARITY CHECK (LDPC) CODE USED IN ENCODING BITS OF A CODEWORD

1604

ENCODE, BY AN ENCODER CIRCUIT, DATA BITS TO GENERATE THE CODEWORD USING THE LDPC CODE DERIVED FROM THE SELECTED BG

1606

TRANSMIT, BY THE TRANSCEIVER CIRCUIT USING THE ONE OR MORE ANTENNA ELEMENTS, THE CODEWORD

FIG. 16

1700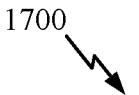

1702

RECEIVE, BY A TRANSCEIVER CIRCUIT USING ONE OR MORE ANTENNA ELEMENTS IN ELECTRICAL COMMUNICATION WITH THE TRANSCEIVER CIRCUIT, CONTROL INFORMATION INDICATING A BASE GRAPH (BG) FROM WHICH TO DERIVE A LOW DENSITY PARITY CHECK (LDPC) CODE USED IN ENCODING BITS OF A CODEWORD

1704

RECEIVE, BY THE TRANSCEIVER CIRCUIT USING THE ONE OR MORE ANTENNA ELEMENTS, THE CODEWORD

1706

DECODE, BY A DECODER CIRCUIT, THE CODEWORD USING THE LDPC CODE DERIVED FROM THE SELECTED BG

FIG. 17

COMMUNICATION TECHNIQUES APPLYING LOW-DENSITY PARITY-CHECK CODE BASE GRAPH SELECTION

CROSS-REFERENCE TO RELATED APPLICATIONS

The present Application for patent is a continuation of U.S. patent application Ser. No. 16/664,157, filed Oct. 25, 2019, which is a continuation of International Application No. PCT/US2018/040507, filed Jun. 30, 2018, which is a continuation of U.S. patent application Ser. No. 16/023,807, filed Jun. 29, 2018, which claims benefit of and priority to U.S. Provisional Application No. 62/529,765, filed Jul. 7, 2017, all of which are assigned to the assignee hereof and hereby expressly incorporated by reference herein in their entireties as if fully set forth below and for all applicable purposes.

TECHNICAL FIELD

Certain aspects of the technology discussed below generally relate to wireless communications and, more particularly, to methods and apparatus for determining base graphs for deriving low-density parity-check (LDPC) codes for use in encoding and decoding data in transmissions. Embodiments can aid in encoding and decoding data by way of techniques associated with appropriate base graph selection.

INTRODUCTION

Wireless communication systems are widely deployed to provide various types of communication content such as voice, video, data, message, broadcasts, and so on. These systems may employ multiple-access technologies capable of supporting communication with multiple users by sharing available system resources (e.g., bandwidth and transmit power). Examples of such multiple-access systems include code division multiple access (CDMA) systems, time division multiple access (TDMA) systems, time division synchronous CDMA (TD-SCDMA) systems, frequency division multiple access (FDMA) systems, single-carrier FDMA (SC-FDMA) systems, orthogonal FDMA (OFDMA), 3rd Generation Partnership Project (3GPP) long term evolution (LTE) systems, and LTE Advanced (LTE-A) systems.

Multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Generally, a wireless multiple-access communication system can simultaneously support communication for multiple wireless nodes. Each node communicates with one or more base stations (BSs) via transmissions on forward and reverse links. The forward link (or downlink) refers to a communication link from BSs to nodes, and a reverse link (or uplink) refers to a communication link from nodes to base stations.

Communication links may be established via a single-input single-output, multiple-input single-output, or a MIMO system.

In some examples, a wireless multiple-access communication system may include a number of BSs, each simultaneously supporting communication for multiple communication devices, otherwise known as user equipment (UEs). In an LTE or LTE-A network, a set of one or more BSs may define an e NodeB (eNB). In other examples (e.g., in a next generation, NR, or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., a BS, a NR BS, a 5G BS, a NB, an eNB, NR NB, a 5G NB, an access point (AP)), a network node, a gNB, a TRP, etc.). A BS, AN, or DU may communicate with a UE or a set of UEs on downlink channels (e.g., for transmissions from a BS or to a UE) and uplink channels (e.g., for transmissions from a UE to a BS, AN, or DU).

Binary values (e.g., ones and zeros), are used to represent and communicate various types of information, such as video, audio, statistical information, etc. Unfortunately, during storage, transmission, and/or processing of binary data, errors may be unintentionally introduced; for example, a "1" may be changed to a "0" or vice versa.

BRIEF SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later. After considering this discussion, and particularly after reading the section entitled "Detailed Description" one will understand how the features of this disclosure provide advantages that include improved communications between access points and stations in a wireless network.

Generally, in the case of data transmission, a receiver observes each received bit in the presence of noise or distortion and only an indication of the bit's value is obtained. Under these circumstances, the observed values are interpreted as a source of "soft" bits. A soft bit indicates a preferred estimate of the bit's value (e.g., a 1 or a 0) together with some indication of the reliability of that estimate. While the number of errors may be relatively low, even a small number of errors or level of distortion can result in the data being unusable or, in the case of transmission errors, may necessitate re-transmission of the data. In order to provide a mechanism to check for errors and, in some cases, to correct errors, binary data can be coded to introduce carefully designed redundancy. Coding of a unit of data produces what is commonly referred to as a codeword. Because of its redundancy, a codeword will often include more bits than the input unit of data from which the codeword was produced.

Redundant bits are added by an encoder to the transmitted bitstream to create a codeword. When signals arising from transmitted codewords are received or processed, the redundant information included in the codeword as observed in the signal can be used to identify and/or correct errors in or remove distortion from the received signal to recover the original data unit. Such error checking and/or correcting can be implemented as part of a decoding process. In the absence of errors, or in the case of correctable errors or distortion, decoding can be used to recover from the source data being processed, the original data unit that was encoded. In the case of unrecoverable errors, the decoding process may produce some indication that the original data cannot be fully recovered. Such indications of decoding failure initiate retransmission of the data.

Certain aspects of the present disclosure generally relate to methods and apparatus for determining a base graph used to derive a low-density parity-check (LDPC) code used for encoding a retransmission of an original transmission.

Certain aspects of the present disclosure provide a method for wireless communications that may be performed by a base station (BS) comprising a processor in electrical communication with a memory, the processor configured to obtain data from the memory in preparation for wireless communications. The method generally includes transmitting, by a transceiver circuit using one or more antenna elements in electrical communication with the transceiver circuit, a first codeword to a user equipment (UE), the first codeword encoded using a first low-density parity-check (LDPC) code derived from a base graph (BG) selected by the processor based on a code block size (CBS) and a first code rate of the transmission, obtaining, by the transceiver circuit, an indication that the UE did not receive the first codeword, selecting, by the processor, a second code rate for a retransmission of information bits of the first codeword, wherein the selection is from a restricted set of code rates designed to ensure the UE selects a same BG to decode the retransmission, and retransmitting, by the transceiver circuit using the one or more antenna elements, the information bits in a second codeword according to the selected second code rate.

Certain aspects of the present disclosure provide a method for wireless communications that may be performed by a base station (BS) comprising a processor in electrical communication with a memory, the processor configured to obtain data from the memory in preparation for wireless communications. The method generally includes selecting, by the processor and based on a modulation and coding scheme (MCS) and a resource allocation (RA) for transmitting a codeword, a base graph (BG) stored in said memory, from which to derive a low density parity check (LDPC) code for use in encoding data bits in the codeword, encoding, by an encoder circuit, the data bits to generate the codeword using the LDPC code derived from the selected BG, and transmitting, by a transceiver circuit, the codeword using the MCS via resources of the RA using one or more antenna elements in electrical communication with the transceiver circuit.

Certain aspects of the present disclosure provide a method for wireless communications that may be performed by a user equipment (UE) comprising a processor in electrical communication with a memory, the processor configured to obtain data from the memory in preparation for wireless communications. The method generally includes receiving, by a transceiver circuit using one or more antenna elements in electrical communication with the transceiver circuit, control information indicating a modulation and coding scheme (MCS) and resource allocation (RA) for transmission of a codeword, selecting, by the processor and based on the MCS and the RA, a base graph (BG) from which to derive a low density parity check (LDPC) code for use in decoding the codeword, receiving, by the transceiver circuit using the one or more antenna elements, the codeword via resources of the RA, and decoding, by a decoder circuit, the codeword using the LDPC code derived from the selected BG.

Certain aspects of the present disclosure provide a method for wireless communications that may be performed by a base station (BS) comprising a processor in electrical communication with a memory, the processor configured to obtain data from the memory in preparation for wireless communications. The method generally includes transmitting, by a transceiver circuit using one or more antenna elements in electrical communication with the transceiver circuit, control information indicating a base graph (BG) from which to derive a low density parity check (LDPC) code used in encoding data bits of a codeword, encoding, by an encoder circuit, the data bits to generate the codeword using the LDPC code derived from the selected BG, and transmitting, by the transceiver circuit using the one or more antenna elements, the codeword.

Certain aspects of the present disclosure provide a method for wireless communications that may be performed by a user equipment (UE) comprising a processor in electrical communication with a memory, the processor configured to obtain data from the memory in preparation for wireless communications. The method generally includes receiving, by a transceiver circuit using one or more antenna elements in electrical communication with the transceiver circuit, control information indicating a base graph (BG) from which to derive a low density parity check (LDPC) code used in encoding bits of a codeword, receiving, by the transceiver circuit using the one or more antenna elements, the codeword, and decoding, by a decoder circuit, the codeword using the LDPC code derived from the selected BG.

Certain aspects of the present disclosure provide an apparatus for wireless communications. The apparatus generally includes a processor configured to cause the apparatus to transmit a first codeword to a user equipment (UE), the first codeword encoded using a first low-density parity-check (LDPC) code derived from a base graph (BG) selected based on a code block size (CBS) and a first code rate of the transmission, to obtain an indication that the UE did not receive the first codeword, to select a second code rate for a retransmission of information bits of the first codeword, wherein the selection is from a restricted set of code rates designed to ensure the UE selects a same BG to decode the retransmission, and to cause the apparatus to retransmit the information bits in a second codeword according to the selected second code rate.

Certain aspects of the present disclosure provide an apparatus for wireless communications. The apparatus generally includes a processor configured to select, based on a modulation and coding scheme (MCS) and a resource allocation (RA) for transmitting a codeword, a base graph (BG) from which to derive a low density parity check (LDPC) code for use in encoding data bits in the codeword to encode the data bits to generate the codeword using the LDPC code derived from the selected BG, and to cause the apparatus to transmit the codeword using the MCS and via resources of the RA, and a memory coupled with the processor.

Certain aspects of the present disclosure provide an apparatus for wireless communications. The apparatus generally includes a processor configured to cause the apparatus to receive control information indicating a modulation and coding scheme (MCS) and resource allocation (RA) for transmission of a codeword, to select a base graph (BG), from which to derive a low density parity check (LDPC) code for use in decoding the codeword, based on the MCS and the RA, to cause the apparatus to receive the codeword via resources of the RA, and to decode the codeword using the LDPC code derived from the selected BG, and a memory coupled with the processor.

Certain aspects of the present disclosure provide an apparatus for wireless communications. The apparatus generally includes a processor configured to cause the apparatus to transmit control information indicating a base graph (BG) from which to derive a low density parity check (LDPC) code used in encoding bits of a codeword, to encode data bits to generate the codeword using the LDPC code derived from the selected BG, and to cause the apparatus to transmit the codeword.

Certain aspects of the present disclosure provide an apparatus for wireless communications. The apparatus generally includes a processor configured to cause the apparatus to receive control information indicating a base graph (BG) from which to derive a low density parity check (LDPC) code used in encoding bits of a codeword, to cause the apparatus to receive the codeword, and to decode the codeword using the LDPC code derived from the selected BG, and a memory coupled with the processor.

Certain aspects of the present disclosure provide an apparatus for wireless communications. The apparatus generally includes means for transmitting a first codeword to a user equipment (UE), the first codeword encoded using a first low-density parity-check (LDPC) code derived from a base graph (BG) selected based on a code block size (CBS) and a first code rate of the transmission, means for obtaining an indication that the UE did not receive the first codeword, means for selecting a second code rate for a retransmission of information bits of the first codeword, wherein the selection is from a restricted set of code rates designed to ensure the UE selects a same BG to decode the retransmission, and means for retransmitting the information bits in a second codeword according to the selected second code rate.

Certain aspects of the present disclosure provide an apparatus for wireless communications. The apparatus generally includes means for selecting, based on a modulation and coding scheme (MCS) and a resource allocation (RA) for transmitting a codeword, a base graph (BG), from which to derive a low density parity check (LDPC) code for use in encoding data bits in the codeword, means for encoding the data bits to generate the codeword using the LDPC code derived from the selected BG, and means for transmitting the codeword using the MCS via resources of the RA.

Certain aspects of the present disclosure provide an apparatus for wireless communications. The apparatus generally includes means for receiving control information indicating a modulation and coding scheme (MCS) and resource allocation (RA) for transmission of a codeword, means for selecting a base graph (BG), from which to derive a low density parity check (LDPC) code for use in decoding the codeword, based on the MCS and the RA, means for receiving the codeword via resources of the RA, and means for decoding the codeword using the LDPC code derived from the selected BG.

Certain aspects of the present disclosure provide an apparatus for wireless communications. The apparatus generally includes means for transmitting control information indicating a base graph (BG) from which to derive a low density parity check (LDPC) code used in encoding bits of a codeword, means for encoding data bits to generate the codeword using the LDPC code derived from the selected BG, and means for transmitting the codeword.

Certain aspects of the present disclosure provide an apparatus for wireless communications. The apparatus generally includes means for receiving control information indicating a base graph (BG) from which to derive a low density parity check (LDPC) code used in encoding bits of a codeword, means for receiving the codeword, and means for decoding the codeword using the LDPC code derived from the selected BG.

Certain aspects of the present disclosure provide a computer-readable medium for wireless communications. The computer-readable medium includes instructions that, when executed by a processing system, cause the processing system to perform operations generally including transmitting a first codeword to a user equipment (UE), the first codeword encoded using a first low-density parity-check (LDPC) code derived from a base graph (BG) selected based on a code block size (CBS) and a first code rate of the transmission, obtaining an indication that the UE did not receive the first codeword, selecting a second code rate for a retransmission of information bits of the first codeword, wherein the selection is from a restricted set of code rates designed to ensure the UE selects a same BG to decode the retransmission, and retransmitting the information bits in a second codeword according to the selected second code rate.

Certain aspects of the present disclosure provide a computer-readable medium for wireless communications. The computer-readable medium includes instructions that, when executed by a processing system, cause the processing system to perform operations generally including selecting, based on a modulation and coding scheme (MCS) and a resource allocation (RA) for transmitting a codeword, a base graph (BG) from which to derive a low density parity check (LDPC) code for use in encoding data bits in the codeword, encoding the data bits to generate the codeword using the LDPC code derived from the selected BG, and transmitting the codeword using the MCS via resources of the RA.

Certain aspects of the present disclosure provide a computer-readable medium for wireless communications. The computer-readable medium includes instructions that, when executed by a processing system, cause the processing system to perform operations generally including receiving control information indicating a modulation and coding scheme (MCS) and resource allocation (RA) for transmission of a codeword, selecting, based on the MCS and the RA, a base graph (BG), from which to derive a low density parity check (LDPC) code for use in decoding the codeword, receiving the codeword via resources of the RA, and decoding the codeword using the LDPC code derived from the selected BG.

Certain aspects of the present disclosure provide a computer-readable medium for wireless communications. The computer-readable medium includes instructions that, when executed by a processing system, cause the processing system to perform operations generally including transmitting control information indicating a base graph (BG) from which to derive a low density parity check (LDPC) code used in encoding bits of a codeword, encoding data bits to generate the codeword using the LDPC code derived from the selected BG, and transmitting the codeword.

Certain aspects of the present disclosure provide a computer-readable medium for wireless communications. The computer-readable medium includes instructions that, when executed by a processing system, cause the processing system to perform operations generally including receiving control information indicating a base graph (BG) from which to derive a low density parity check (LDPC) code used in encoding bits of a codeword, receiving the codeword, and decoding the codeword using the LDPC code derived from the selected BG.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method embodiments such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

FIG. 13 is a flow diagram illustrating example operations for wireless communications, in accordance with certain aspects of the present disclosure.

FIG. 14 is a flow diagram illustrating example operations for wireless communications, in accordance with certain aspects of the present disclosure.

FIG. 15 is a flow diagram illustrating example operations for wireless communications, in accordance with certain aspects of the present disclosure.

FIG. 16 is a flow diagram illustrating example operations for wireless communications, in accordance with certain aspects of the present disclosure.

FIG. 17 is a flow diagram illustrating example operations for wireless communications, in accordance with certain aspects of the present disclosure.

To facilitate understanding, identical reference numerals have been used, where possible, to designate identical elements that are common to the figures. Elements disclosed in one embodiment may be beneficially utilized on other embodiments without specific recitation.

DETAILED DESCRIPTION

Figure 1:
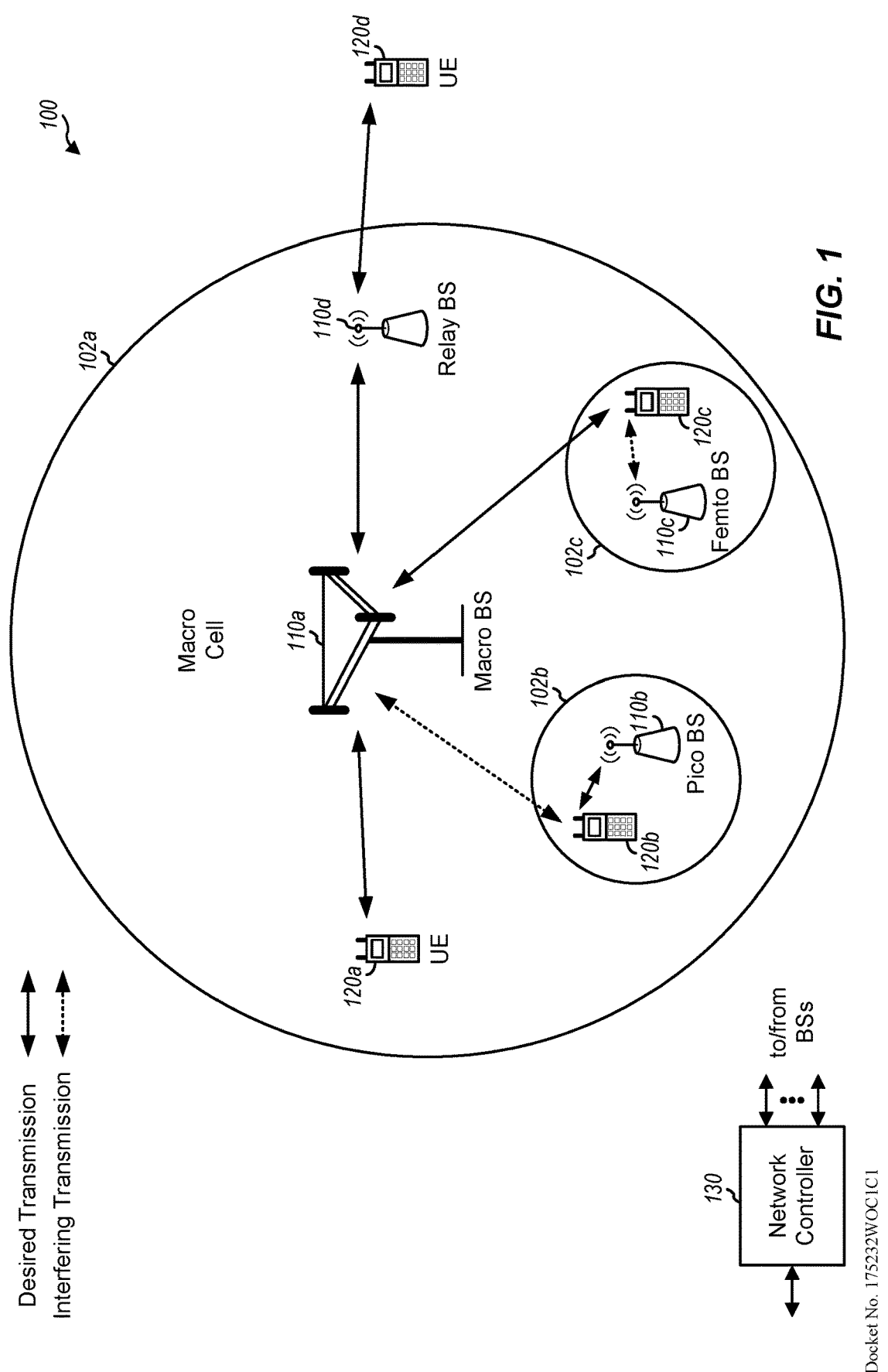
FIG. 1 is a block diagram conceptually illustrating an example wireless communication system, in accordance with certain aspects of the present disclosure.

Aspects of the present disclosure provide apparatuses, methods, processing systems, hardware components, and computer program products for determining a base graph (BG) that can be used for deriving a low-density parity-check (LDPC) code. An LPDC code can be used for encoding (and/or decoding) a codeword transmitted in a retransmission of data in a new radio (NR) access technology (e.g., 5G radio access) wireless communications system.

The term 'New Radio' (abbreviated NR) refers generally to a new type of communication network and related components for implementing 5G networks and beyond. NR may refer to radios configured to operate according to a new air interface or fixed transport layer. NR may include support for enhanced mobile broadband (eMBB) service targeting wide bandwidth (e.g., 80 MHz and wider) communications, millimeter wave (mmW) service targeting high carrier frequency (e.g., 27 GHz and higher) communications, massive machine type communications (mMTC) service targeting non-backward compatible machine type communications (MTC) techniques, and/or mission critical (MiCr) service targeting ultra-reliable low-latency communications (URLLC). These services may include latency and reliability requirements for a variety of uses, timing requirements, and other design considerations. NR may use low-density parity-check (LDPC) coding and/or polar codes.

NR standardization has introduced two low-density parity-check (LDPC) base graphs (BG1, BG2) from which an LDPC code may be derived for encoding data (see, e.g., TS 38.212, v 15.1.1, secs. 6.2.2 and 7.2.2). On each slot transmission, one of the base graphs is selected for usage, i.e., for deriving an LDPC code used to encode the transmission. The base graph (e.g., BG1 or BG2) used for encoding is implicitly indicated by code block size and code rate of the transmission.

It is therefore desirable to develop techniques for a UE to determine the BG used in a transmission. It is also desirable to develop techniques for a UE to determine the BG used in a retransmission in situations in which the UE misses (e.g., fails to properly decode, fails to receive) the control information for the original data transmission or the original data transmission.

According to aspects of the present disclosure, a BS transmits a choice of modulation and coding scheme (MCS) and a resource allocation (RA) in downlink control information (DCI). The DCI can correspond to a data transmission (e.g., a codeword) that the BS is transmitting or will transmit. A UE receives the DCI and, if the DCI is intended for the UE, then the UE can determine a transport block size (TBS) for the data transmission based on the MCS and RA and according to a network specification. Upon determination of the TBS, the UE can determine the LDPC BG the BS used to encode a data transmission based on values of the code block size and code rate implied by the TBS and the RA.

If the UE does not successfully receive the data transmission, then the BS may retransmit the data in a retransmission. For retransmissions, regardless of any new MCS and RA chosen for the retransmission, it is desirable for the BS to encode the data using the same BG as used for the original data transmission and for the UE to select the BG used in the original data transmission for decoding the retransmissions. Using the same BG for encoding and decoding the retransmissions may ensure proper hybrid automatic retransmission request (HARM) combining (e.g., of the retransmission(s) and the original transmission) and LDPC decoding of the combination of the original data transmission and any retransmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 is described in documents from an organization named "3rd Generation Partnership Project 2" (3GPP2). NR is an emerging wireless communications technology under development in conjunction with the 5G Technology Forum (5GTF). These communications networks are merely listed as examples of networks in which the techniques described in this disclosure may be applied; however, this disclosure is not limited to the above-described communications network.

For clarity, while aspects may be described herein using terminology commonly associated with 3G and/or 4G or LTE wireless technologies, aspects of the present disclosure can be applied in other generation-based communication systems, such as 5G and later, including NR or 5G/NR technologies.

An Example Wireless Communication System

FIG. 1 illustrates an example communications network 100 in which aspects of the present disclosure may be performed. Wireless communications network 100 may be a new radio (NR) or 5G network. Wireless communications network 100 may include a transmitting device such as a user equipment (UE) 120 or a base station (BS) 110. Transmitting devices can communicate with one or more other devices and utilize techniques discussed herein to communicate efficiently and in a variety of manners as envisioned to be brought about by 5G communications technology.

Innovations discussed in this disclosure can be implemented for transmissions and receptions. In one example, a transmitting device may perform encoding according to aspects described herein using lifted LDPC codes that may be compactly described (e.g., determined/generated/stored). In another example, a receiving device (e.g., a UE 120 or a BS 110) can perform corresponding decoding operations. In some aspects, a transmitting device can select at least one lifting size value for generating a group of lifted LDPC codes comprising copies of a base LDPC code defined by a base matrix having a first number of base variable nodes and a second number of base check nodes. The lifting size value is selected from a range of values. The transmitting device can generate a base matrix based on a lifting value of a set of lifting values associated with the selected lifting size value and generate a matrix for a different lifting size value in the group based on the base matrix.

As illustrated in FIG. 1, wireless communications network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, TRP, etc., may be interchangeable. In some examples, a cell may not necessarily be stationary. And the geographic area of the cell may move according to the location of a mobile BS. In some examples, the BSs may be interconnected to one another and/or to one or more other BSs or network nodes (not shown) in wireless communications network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed in concert with 2G, 3G, 4G, licensed, unlicensed, hybrid, and/or future networks.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, BS 110a, BS 110b, and BS 110c may be macro BSs for the macro cell 102a, macro cell 102b, and macro cell 102c, respectively. BS 110x may be a pico BS for pico cell 102x. BS 110y and BS 110z may be femto BS for the femto cell 102y and femto cell 102z, respectively. A BS may support one or multiple (e.g., three) cells.

Wireless communications network 100 may also include relay stations. A relay station is a station that receives a transmission of data and/or other information from an upstream station (e.g., a BS 110 or a UE 120). A relay station can send a transmission of the data and/or other information to a downstream station (e.g., a UE 120 or a BS 110). A relay station may also be a UE that relays transmissions for other UEs. In the example shown in FIG. 1, relay station 110r may communicate with BS 110a and UE 120r in order to facilitate communication between BS 110a and UE 120r. A relay station may also be referred to as a relay, a relay eNB, etc.

Wireless communications network 100 may be a heterogeneous network that includes BSs of different types, for example, macro BS, pico BS, femto BS, relays, etc. These different types of BSs may have different transmit power levels, different coverage areas, and different impact on interference in the wireless communications network 100. For example, a macro BS may have a high transmit power level (e.g., 20 Watts) whereas pico BS, femto BS, and relays may have a lower transmit power level (e.g., 1 Watt).

Wireless communications network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

Network controller 130 may couple to a set of BSs and provide coordination and control for these BSs. Network controller 130 may communicate with BSs 110 via a backhaul. BSs 110 may also communicate with one another, e.g., directly or indirectly via wireless or wireline backhaul.

UEs 120 (e.g., UE 120x, UE 120y, etc.) may be dispersed throughout wireless communications network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices.

In FIG. 1, a solid line with double arrows indicates desired transmissions between a UE and a serving BS, which is a BS designated to serve the UE on the downlink and/or uplink A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (i.e., 180 kHz). Consequently, the nominal Fast Fourier Transform (FFT) size may be equal to 128, 256, 512, 1024 or 2048 for system bandwidth of 1.25 MHz, 2.5 MHz, 5 MHz, 10 MHz, or 20 MHz, respectively. The system bandwidth may also be partitioned into subbands. For example, a subband may cover 1.08 MHz (i.e., 6 RBs), and there may be 1, 2, 4, 8 or 16 subbands for system bandwidth of 1.25 MHz, 2.5 MHz, 5 MHz, 10 MHz, or 20 MHz, respectively.

NR may utilize OFDM with a CP on uplink and downlink and include support for half-duplex operation using TDD. A single component carrier bandwidth of 100 MHz may be supported. NR RBs may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., downlink or uplink) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based.

In some examples, access to the air interface may be scheduled. For example, a scheduling entity (e.g., a BS 110 or UE 120) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

The NR radio access network (RAN) may include one or more central units (CUs) and distributed units (DUs). A NR BS (e.g., a gNB, a 5G NB, a NB, a 5G NB, a transmission reception point (TRP), an AP) may correspond to one or multiple cells. NR cells can be configured as access cells (ACells) or data only cells (DCells). DCells may be cells used for carrier aggregation or dual connectivity, but not used for initial access, cell selection/reselection, or handover.

Figure 2:
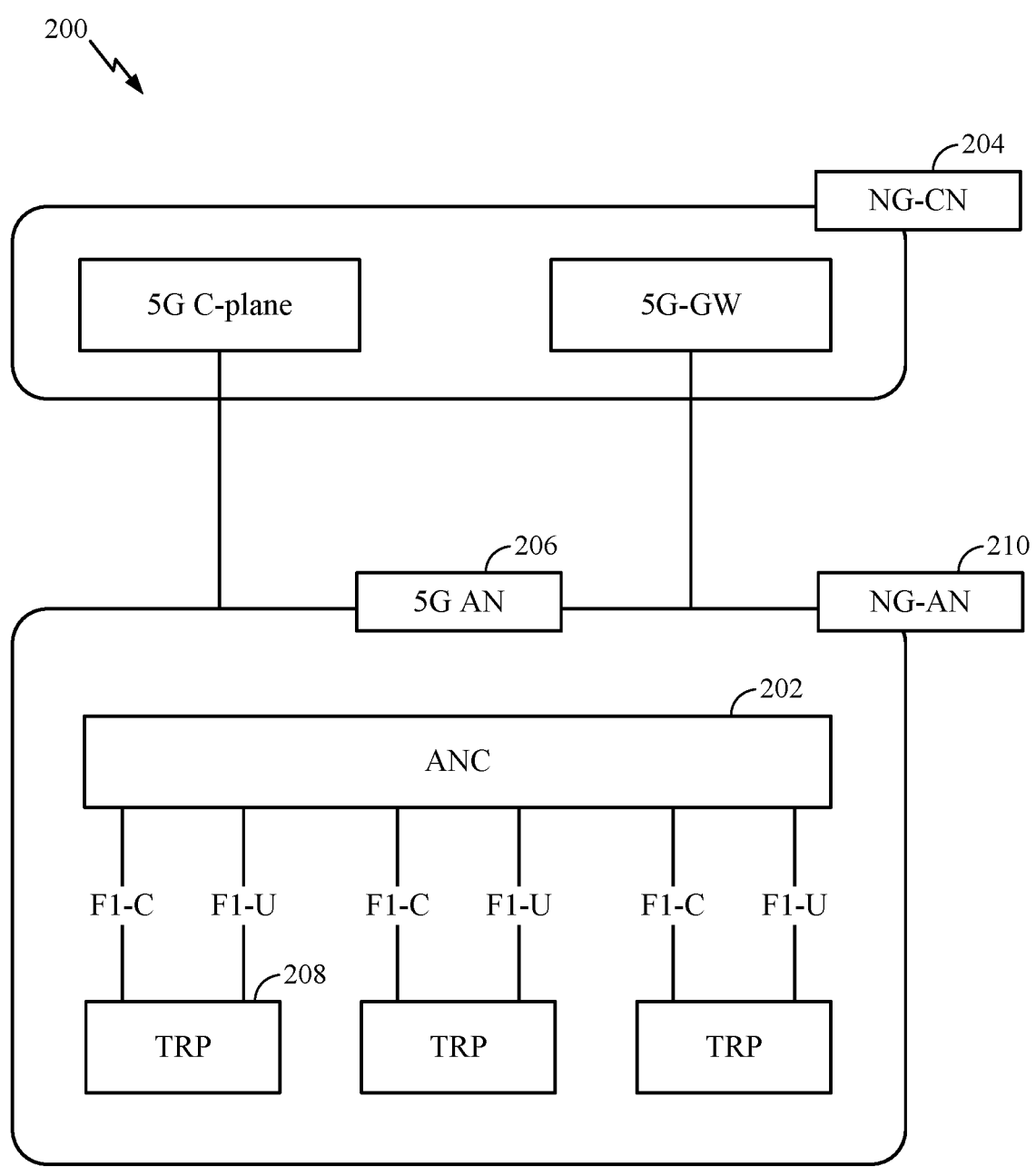
FIG. 2 is a block diagram illustrating an example logical architecture of a distributed RAN, in accordance with certain aspects of the present disclosure.

FIG. 2 illustrates an example logical architecture of a distributed RAN 200. In some aspects, the RAN 200 may be implemented in wireless communications system 100 illustrated in FIG. 1. 5G access node (AN) 206 may include access node controller (ANC) 202. The ANC 202 may be a CU of distributed RAN 200. A backhaul interface to next generation core network (NG-CN) 204 may terminate at ANC 202. A backhaul interface to neighboring next generation access nodes (NG-ANs) may terminate at ANC 202. ANC 202 may include one or more TRPs 208.

TRPs 208 comprise DUs. TRPs 208 may be connected to one ANC (ANC 202) or more than one ANC (not illustrated). For example, for RAN sharing, radio as a service (RaaS), and service specific AND deployments, the TRP may be connected to more than one ANC 202. A TRP 208 may include one or more antenna ports. TRPs 208 may be configured to individually (e.g., dynamic selection) or jointly (e.g., joint transmission) serve traffic to a UE (e.g., a UE 120).

Example logical architecture of the distributed RAN 200 may be used to illustrate fronthaul definition. The logical architecture may support fronthauling solutions across different deployment types. For example, the logical architecture may be based on transmit network capabilities (e.g., bandwidth, latency, and/or jitter). The logical architecture may share features and/or components with LTE. NG-AN 210 may support dual connectivity with NR. NG-AN 210 may share a common fronthaul for LTE and NR. The logical architecture may enable cooperation between and among TRPs 208. For example, cooperation may be pre-configured within a TRP 208 and/or across TRPs 208 via ANC 202. There may be no inter-TRP interface.

The logical architecture for distributed RAN 200 may include a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be placed at the DU (e.g., a TRP 208) or the CU (e.g., ANC 202).

Figure 3:
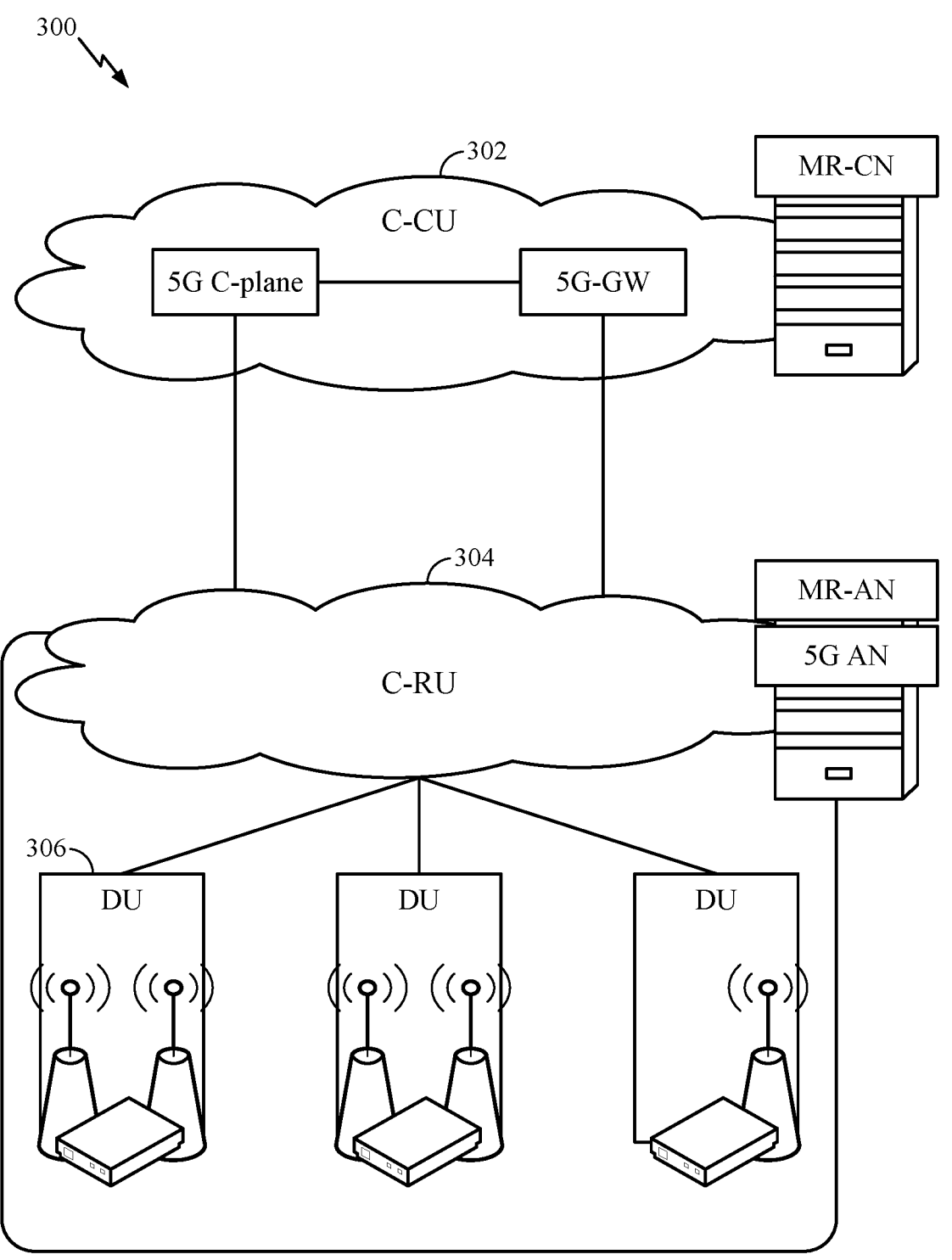
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. As shown in FIG. 3, distributed RAN 300 includes centralized core network unit (C-CU) 302, centralized RAN unit (C-RU) 304, and DU 306.

C-CU 302 may host core network functions. C-CU 302 may be centrally deployed. C-CU 302 functionality may be offloaded (e.g., to advanced wireless services (AWS)), in an effort to handle peak capacity. C-RU 304 may host one or more ANC functions. Optionally, C-RU 304 may host core network functions locally. C-RU 304 may have a distributed deployment. C-RU 304 may be located near an edge the network. DU 306 may host one or more TRPs (edge node (EN), an edge unit (EU), a radio head (RH), a smart radio head (SRH), or the like). DU 306 may be located at edges of the network with radio frequency (RF) functionality.

Figure 4:
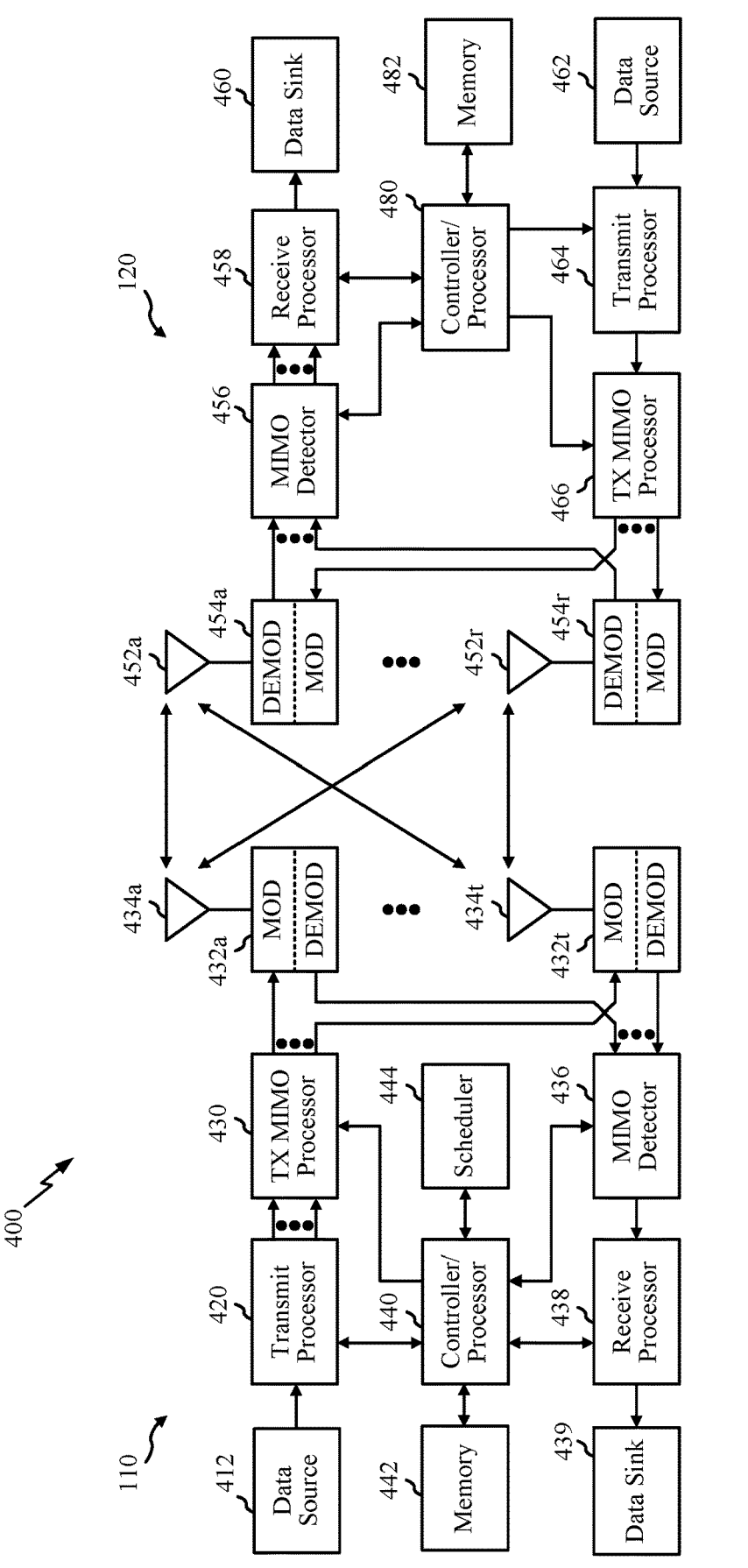
FIG. 4 is a block diagram conceptually illustrating a design of an example base station (BS) and user equipment (UE), in accordance with certain aspects of the present disclosure.

FIG. 4 illustrates example components of the BS 110 and the UE 120 illustrated in FIG. 1. These components can be used to implement aspects of the present disclosure for high performance, flexible, and compact LDPC coding. One or more of the components of BS 110 and UE 120 illustrated in FIG. 4 may be used to practice aspects of the present disclosure. For example, antenna(s) 452a-454r, Demodulator(s)/Modulator(s) 454a-454r, TX MIMO processor 466, Receive Processor 458, Transmit Processor 464, and/or Controller/Processor 480 of UE 120 and/or antenna(s) 434a-434t, Demodulator(s)/Modulator(s) 432a-434t, TX MIMO Processors 430, Transmit Processor 420, Receive Processor 438, and/or Controller/Processor 440 of BS 110 may be used to perform the operations 1300-1700 described herein and illustrated with reference to FIGS. 13-17, respectively.

For a restricted association scenario, BS 110 may be macro BS 110c in FIG. 1, and UE 120 may be UE 120y. BS 110 may also be a BS of some other type. BS 110 may be equipped with antennas 434a through 434t and UE 120 may be equipped with antennas 452a through 452r.

At BS 110, transmit processor 420 may receive data from data source 412 and control information from controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), or other control channel or signal. The data may be for the Physical Downlink Shared Channel (PDSCH), or other data channel or signal.

Transmit processor 420 may process (e.g., encode and symbol map) data and control information to obtain data symbols and control symbols, respectively. For example, transmit processor 420 may encode the information bits using LPDC code designs discussed in greater detail below. Transmit processor 420 may also generate reference symbols, for example, for the primary synchronization signal (PSS), secondary synchronization signal (SSS), and cell-specific reference signal (CRS). Transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) an output sample stream to obtain a downlink signal. Downlink signals from modulators 432a through 432t may be transmitted via antennas 434a through 434t, respectively.

At UE 120, antennas 452a through 452r may receive downlink signals from BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. MIMO detector 456 may obtain received symbols from one or more demodulators 454a through 454r, perform MIMO detection on the received symbols if applicable, and provide detected symbols. Receive processor 458 may process (e.g., demodulate, deinterleave, and decode) detected symbols, provide decoded data for UE 120 to a data sink 460, and provide decoded control information to controller/processor 480.

On the uplink, at UE 120, transmit processor 464 may receive and process data (e.g., for the Physical Uplink Shared Channel (PUSCH) or other data channel or signal) from data source 462 and control information (e.g., for the Physical Uplink Control Channel (PUCCH) or other control channel or signal) from controller/processor 480. Transmit processor 464 may also generate reference symbols for a reference signal. The symbols from transmit processor 464 may be precoded by TX MIMO processor 466 if applicable, further processed by demodulators 454a through 454r (e.g., for SC-FDM, etc.), and transmitted to BS 110. At BS 110, the uplink signals from the UE 120 may be received by antennas 434, processed by modulators 432, detected by MIMO detector 436 if applicable, and further processed by receive processor 438 to obtain decoded data and control information sent by UE 120. Receive processor 438 may provide the decoded data to data sink 439 and the decoded control information to controller/processor 440.

The UE 120 can include additional components and features working in tandem with the controller/processor 440. Memory 442 may store data and program codes for BS 110 and memory 482 may store data and program codes for UE 120. Scheduler 444 may schedule UEs for data transmission on the downlink and/or uplink.

Figure 5:
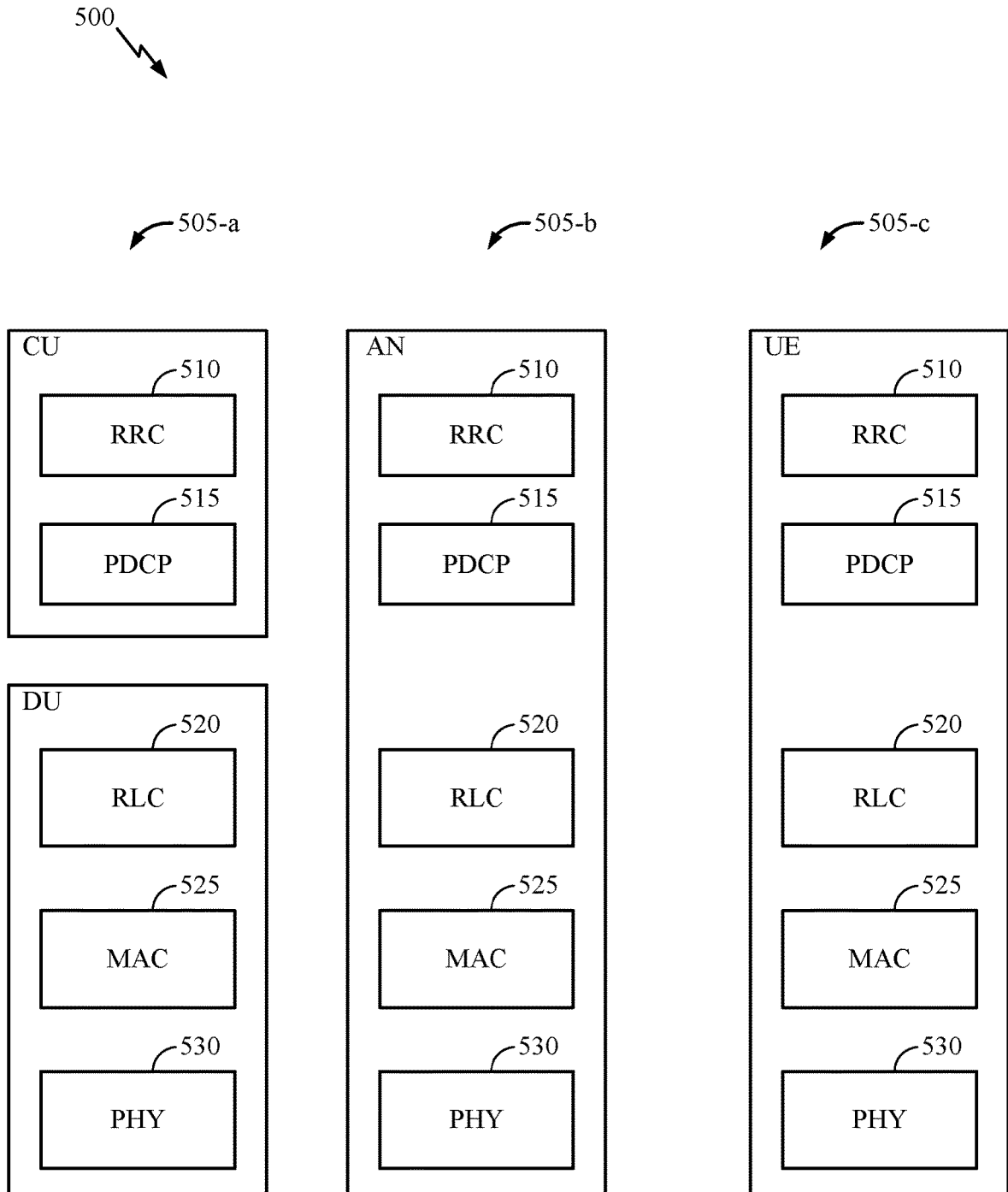
FIG. 5 is a diagram showing examples for implementing a communication protocol stack, in accordance with certain aspects of the present disclosure.

FIG. 5 illustrates a diagram 500 showing examples for implementing a communications protocol stack per aspects of the present disclosure. The illustrated communications protocol stacks may be implemented by devices operating in a in a 5G system (e.g., a system that supports uplink-based mobility). Diagram 500 illustrates a communications protocol stack including RRC layer 510, PDCP layer 515, RLC layer 520, MAC layer 525, and PHY layer 530. In an example, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., ANC 202) and distributed network access device (e.g., DU 208). In the first option 505-a, RRC layer 510 and PDCP layer 515 may be implemented by the CU, and RLC layer 520, MAC layer 525, and PHY layer 530 may be implemented by the DU. In various examples, the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), NR BS, a NR NBa network node (NN), TRP, gNB, etc.). In the second option, RRC layer 510, PDCP layer 515, RLC layer 520, MAC layer 525, and PHY layer 530 may each be implemented by the AN. The second option 505-b may be useful in a femto cell deployment.

Regardless of whether a network access device implements part or all of a protocol stack, a UE may implement the entire protocol stack 505-c (e.g., RRC layer 510, PDCP layer 515, RLC layer 520, MAC layer 525, and PHY layer 530).

Figure 6:
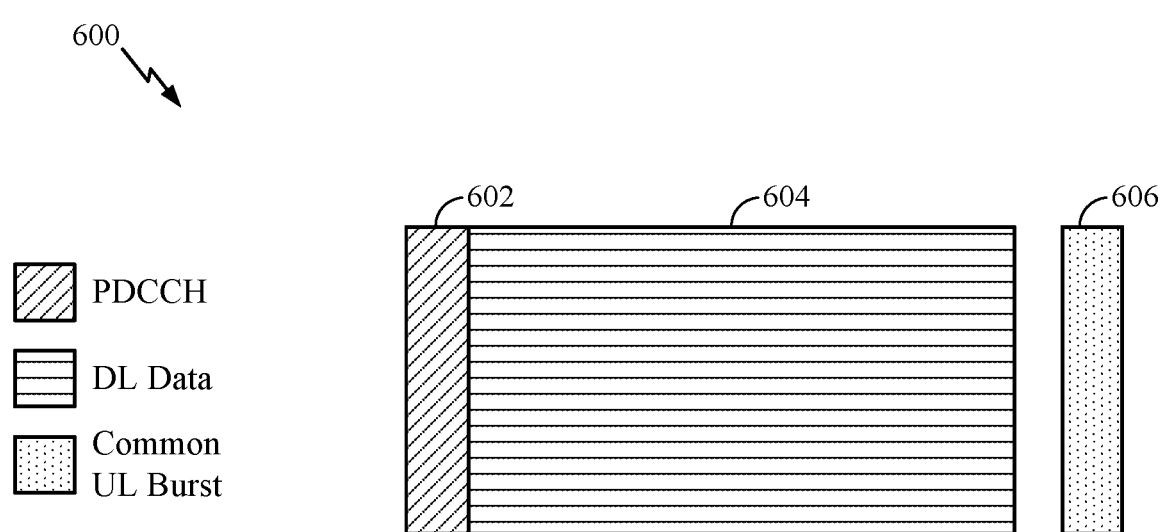
FIG. 6 illustrates an example of a downlink (DL)-centric subframe, in accordance with certain aspects of the present disclosure.

FIG. 6 is a diagram showing an example of a DL-centric subframe 600. The DL-centric subframe 600 may include control portion 602. Control portion 602 may exist in the initial or beginning portion of DL-centric subframe 600. Control portion 602 may include various scheduling information and/or control information corresponding to various portions of DL-centric subframe 600. In some configurations, control portion 602 may be a physical DL control channel (PDCCH), as shown in FIG. 6. DL-centric subframe 600 may also include DL data portion 604. DL data portion 604 may be referred to as the payload of DL-centric subframe 600. DL data portion 604 may include the communication resources utilized to communicate DL data from the scheduling entity (e.g., UE or BS) to the subordinate entity (e.g., UE). In some configurations, DL data portion 604 may be a physical DL shared channel (PDSCH).

DL-centric subframe 600 may also include common UL portion 606. Common UL portion 606 may be referred to as an UL burst, a common UL burst, and/or various other suitable terms. Common UL portion 606 may include feedback information corresponding to various other portions of DL-centric subframe 600. For example, common UL portion 606 may include feedback information corresponding to control portion 602. Non-limiting examples of feedback information may include an acknowledgment (ACK) signal, a negative acknowledgment (NACK) signal, a HARQ indicator, and/or various other suitable types of information. Common UL portion 606 may additionally or alternatively include information, such as information pertaining to random access channel (RACH) procedures, scheduling requests (SRs), and various other suitable types of information. As illustrated in FIG. 6, the end of DL data portion 604 may be separated in time from the beginning of common UL portion 606. This time separation may be referred to as a gap, a guard period, a guard interval, and/or various other suitable terms. This separation provides time for the switchover from DL communication (e.g., reception operation by the subordinate entity (e.g., UE)) to UL communication (e.g., transmission by the subordinate entity (e.g., UE)). The foregoing is merely one example of a DL-centric subframe and alternative structures having similar features may exist without necessarily deviating from the aspects described herein.

Figure 7:
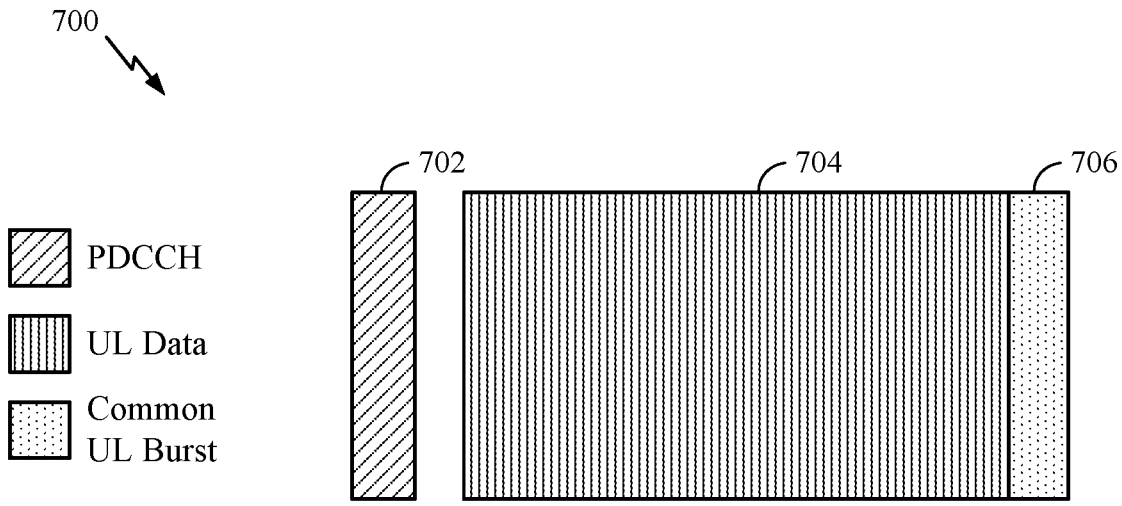
FIG. 7 illustrates an example of an uplink (UL)-centric subframe, in accordance with certain aspects of the present disclosure.

FIG. 7 is a diagram showing an example of an UL-centric subframe 700. UL-centric subframe 700 may include control portion 702. Control portion 702 may exist in the initial or beginning portion of UL-centric subframe 700. Control portion 702 in FIG. 7 may be similar to control portion 602 described above with reference to FIG. 6. UL-centric subframe 700 may also include UL data portion 704. UL data portion 704 may be referred to as the payload of UL-centric subframe 700. UL data portion 704 may refer to the communication resources utilized to communicate UL data from the subordinate entity (e.g., UE) to the scheduling entity (e.g., UE or BS). In some configurations, control portion 702 may be a PDCCH.

As illustrated in FIG. 7, the end of control portion 702 may be separated in time from the beginning of UL data portion 704. This time separation may be referred to as a gap, guard period, guard interval, and/or various other suitable terms. This separation provides time for the switchover from DL communication (e.g., reception operation by the scheduling entity) to UL communication (e.g., transmission by the scheduling entity). UL-centric subframe 700 may also include common UL portion 706. Common UL portion 706 in FIG. 7 may be similar to the common UL portion 606 described above with reference to FIG. 6. Common UL portion 706 may additionally or alternatively include information pertaining to channel quality indicator (CQI), sounding reference signals (SRSs), and various other suitable types of information. The foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLAN), which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Many communications systems use error-correcting codes. Error correcting codes generally compensate for the intrinsic unreliability of information transfer (e.g., over the air medium) in these systems by introducing redundancy into the data stream. Low-density parity-check (LDPC) codes are one type of error correcting codes which use an iterative coding system. Gallager codes are an example of "regular" LDPC codes. Regular LDPC codes are linear block codes in which most of the elements of its parity check matrix H are '0'.

LDPC codes can be represented by bipartite graphs (often referred to as "Tanner graphs"). In a bipartite graph, a set of variable nodes corresponds to bits of a codeword (e.g., information bits or systematic bits), and a set of check nodes correspond to a set of parity-check constraints that define the code. Edges in the graph connect variable nodes to check nodes. Thus, the nodes of the graph are separated into two distinctive sets and with edges connecting nodes of two different types, variable and check.

Graphs as used in LDPC coding may be characterized in a variety of manners. A lifted code is created by copying a bipartite base graph (G) (or a protograph), a number of times, Z. The number of times is referred to herein as the lifting, lifting size, or lifting size value. A variable node and a check node are considered "neighbors" if they are connected by an "edge" (i.e., the line connecting the variable node and the check node) in the graph. In addition, for each edge (e) of the bipartite base graph (G), a permutation (generally an integer value associated with the edge permutation that is represented by k and referred to as the lifting value) is applied to the Z copies of edge (e) to interconnect the Z copies of G. A bit sequence having a one-to-one association with the variable node sequence is a valid codeword if and only if, for each check node, the bits associated with all neighboring variable nodes sum to 0 modulo 2 (i.e., they include an even number of 1's). The resulting LDPC code may be quasi-cyclic (QC) if the permutations (liftings values) used are cyclic.

Figure 8:
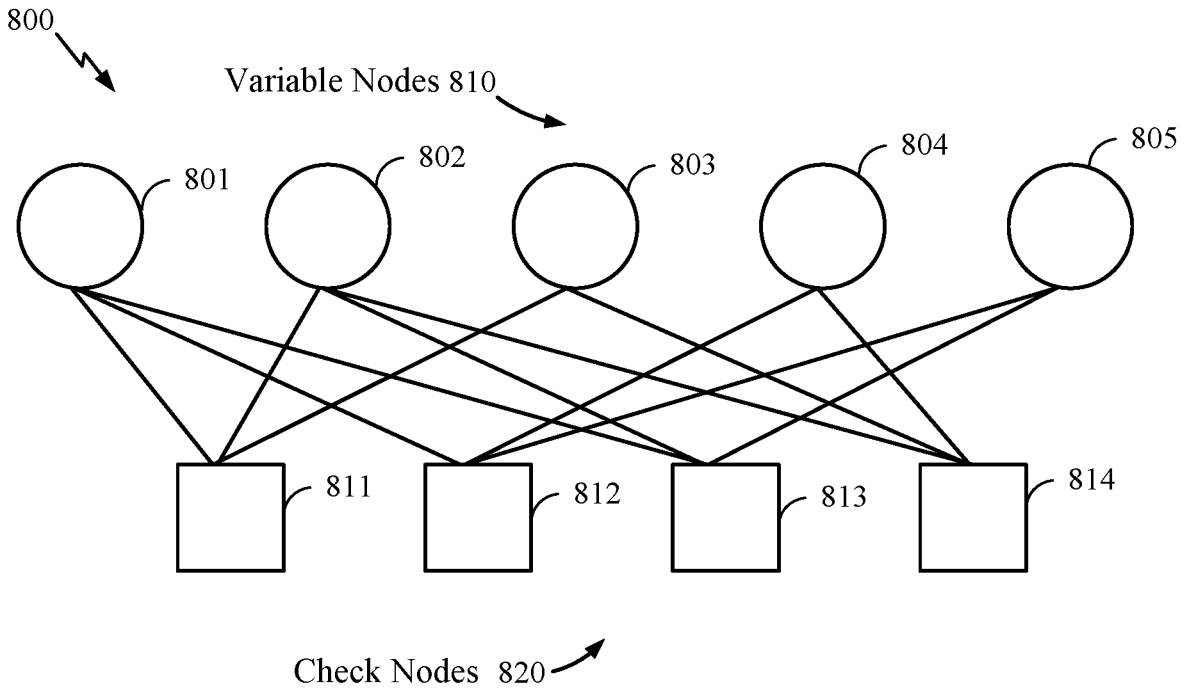
FIG. 8 is a graphical representation of an example low-density parity-check (LDPC) code, in accordance with certain aspects of the present disclosure.
Figure 8A:
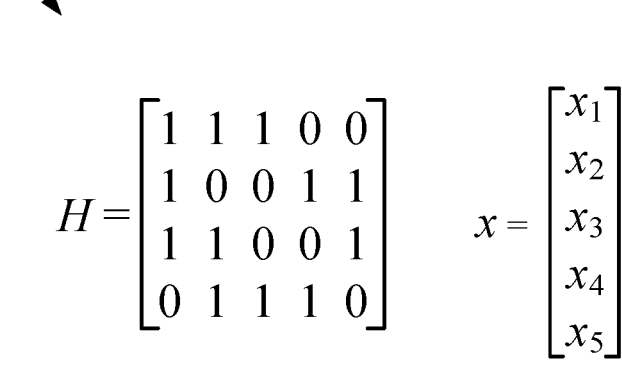
FIG. 8A is a matrix representation of the example LDPC code of FIG. 8, in accordance with certain aspects of the present disclosure.

FIGS. 8-8A show graphical and matrix representations, respectively, of an example LDPC code, in accordance with certain aspects of the present disclosure. For example, FIG. 8 shows a bipartite graph 800 representing an example LDPC code. Bipartite graph 800 includes a set of five variable nodes 810 (represented by circles) connected to four check nodes 820 (represented by squares). Edges in bipartite graph 800 connect variable nodes 810 to check nodes 820 (the edges are represented by the lines connecting variable nodes 810 to check nodes 820). Bipartite graph 800 consists of $|V|=5$ variable nodes and $|C|=4$ check nodes, connected by $|E|=12$ edges.

Bipartite graph 800 may be represented by a simplified adjacency matrix, which may also be known as a parity check matrix (PCM). FIG. 8A shows a matrix representation 800A of bipartite graph 800. Matrix representation 800A includes a PCM H and a codeword vector x, where x1-x5 represent bits of the codeword x. H is used for determining whether a received signal was normally decoded. H has C rows corresponding to j check nodes and V columns corresponding to i variable nodes (i.e., a demodulated symbol), where the rows represent the equations and the columns represents the bits of the codeword. In FIG. 8A, matrix H has four rows and five columns corresponding to four check nodes and five variable nodes, respectively. If a j-th check node is connected to an i-th variable node by an edge (i.e., the two nodes are neighbors), then there is a 1 in the i-th column and in the j-th row of the parity check matrix H. That is, the intersection of an i-th row and a j-th column contains a "1" where an edge joins the corresponding vertices and a "0" where there is no edge. The codeword vector x represents a valid codeword if and only if Hx=0, for example, if for each constraint node, the bits neighboring the constraint, via their association with variable nodes, sum to 0 modulo 2 (i.e., they comprise an even number of 1's). Thus, if the codeword is received correctly, then Hx=0 (mod 2). When the product of a coded received signal and the PCM H becomes '0', this signifies that no error has occurred.

The number of demodulated symbols or variable nodes is the LDPC code length. The number of non-zero elements in a row (column) is defined as the row (column) weight $d(c)d(v)$. The degree of a node refers to the number of edges connected to that node. For example, as shown in FIG. 8, the variable node 801 has three degrees of connectivity, with edges connected to check nodes 811, 812, and 813. Variable node 802 has three degrees of connectivity, with edges connected to check nodes 811, 813, and 814. Variable node 803 has two degrees of connectivity, with edges connected to check nodes 811 and 814. Variable node 804 has two degrees of connectivity, with edges connected to check nodes 812 and 814. And variable node 805 has two degrees of connectivity, with edges connected to check nodes 812 and 813. This feature is illustrated in the matrix H shown in FIG. 8A where the number of edges incident to a variable node 810 is equal to the number of 1's in the corresponding column and is called the variable node degree d(v). Similarly, the number of edges connected with a check node 820 is equal to the number of ones in a corresponding row and is called the check node degree d(c). For example, as shown in FIG. 8A, the first column in the matrix H corresponds to the variable node 801 and the corresponding entries in the column (1, 1, 1, 0) indicates the edge connections to check nodes 811, 812, and 813, while the 0 indicates that there is not an edge to check node 814. The entries in the second, third, fourth, and fourth columns of H represent the edge connections of the variable nodes 802, 803, 804, and 805, respectively, to the check nodes.

A regular graph or a regular code is one for which all variable nodes have the same degree and all constraint nodes have the same degree. On the other hand, an irregular code has constraint nodes and/or variable nodes of differing degrees. For example, some variable nodes may be of degree 4, others of degree 3, and still others of degree 2.

"Lifting" enables LDPC codes to be implemented using parallel encoding and/or decoding implementations while also reducing the complexity typically associated with large LDPC codes. Lifting helps enable efficient parallelization of LDPC decoders while still having a relatively compact description. More specifically, lifting is a technique for generating a relatively large LDPC code from multiple copies of a smaller base code. For example, a lifted LDPC code may be generated by producing Z parallel copies of the base graph (e.g., protograph) and then interconnecting the parallel copies through permutations of edge bundles of each copy of the base graph. The base graph defines the (macro) structure of the code and consists of a number (K) of information bit columns and a number (N) of code bit columns. Lifting the base graph a number of liftings, Z, results in a final information block length of KZ. Some information bits can be shortened (set to 0) to realize information block lengths less than KZ.

Thus, a larger graph can be obtained by a "copy and permute" operation where multiple copies of the base graph are made and connected to form a single lifted graph. For the multiple copies, like edges that are a set of copies of a single base edge are permutated and connected to form a connected graph Z times larger than the base graph.

Figure 9:
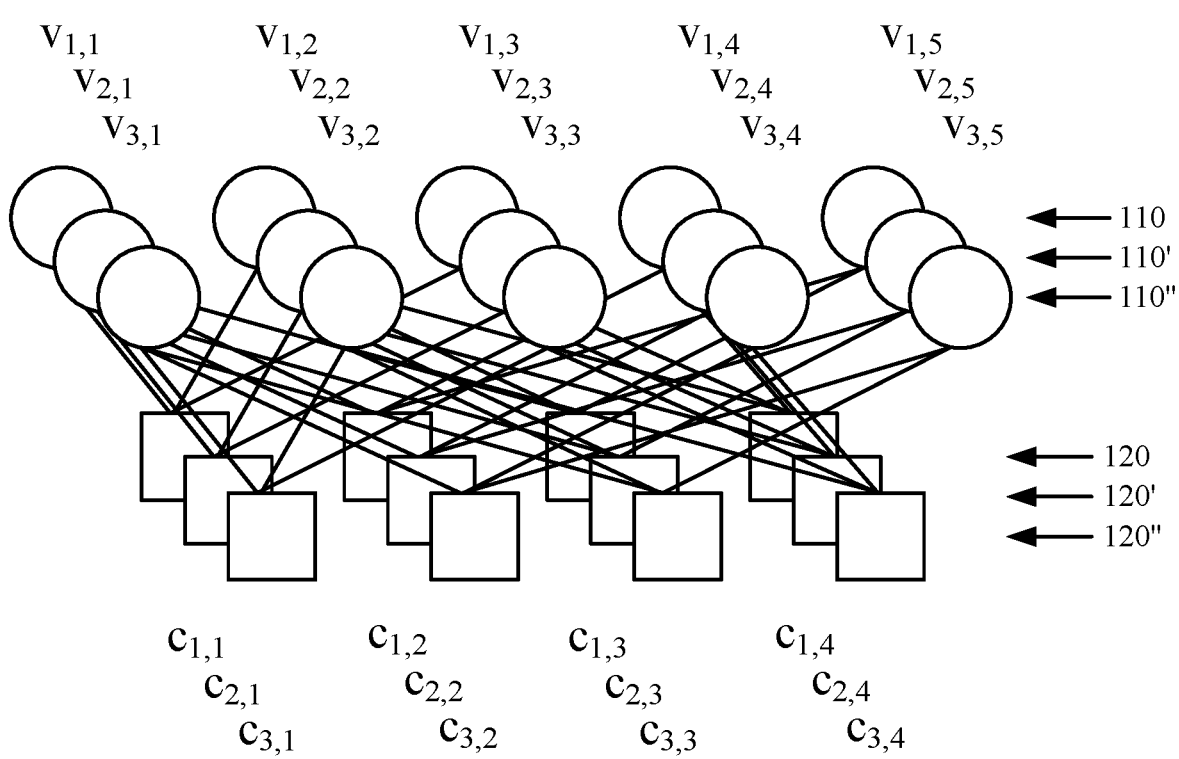
FIG. 9 is a graphical representation of liftings of the LDPC code of FIG. 8, in accordance with certain aspects of the present disclosure.

FIG. 9 is a bipartite graph illustrating liftings of three copies of the bipartite graph 800 of FIG. 8. Three copies may be interconnected by permuting like edges among the copies. If the permutations are restricted to cyclic permutations, then the resulting bipartite graph 900 corresponds to a quasi-cyclic LDPC with lifting Z=3. The original graph 800 from which three copies were made is referred to herein as the base graph. To obtain graphs of different sizes, "copy and permute" operation can be applied to the base graph.

A corresponding PCM of the lifted graph can be constructed from the parity check matrix of the base graph by replacing each entry in the base parity check matrix with a Z×Z matrix. The "0" entries (those having no base edges) are replaced with the 0 matrix and the 1 entries (indicating a base edge) are replaced with a Z×Z permutation matrix. In the case of cyclic liftings, the permutations are cyclic permutations.

A cyclically lifted LDPC code can also be interpreted as a code over the ring of binary polynomials modulo xz+1. In this interpretation, a binary polynomial, $(x)=b0+b1x+b2x2+ \ldots +bz-1xz-1$ may be associated to each variable node in the base graph. The binary vector (b0, b1, b2, . . . , bz-1) corresponds to the bits associated to Z corresponding variable nodes in the lifted graph, that is, Z copies of a single base variable node. A cyclic permutation by k (referred to as a lifting value associated to the edges in the graph) of the binary vector is achieved by multiplying the corresponding binary polynomial by xk where multiplication is taken modulo xz+1. A degree d parity check in the base graph can be interpreted as a linear constraint on the neighboring binary polynomials B1(x), . . . , Bd(x), written as $x^{k_1}B1(x)+x^{k_2}B2(x)+$ . . . $+x^{k_d}Bd(x)=0x^{k_1}B1(x)+x^{k_2}B2(x)+$ . . . $+x^{k_d}Bd(x)=0$, the values, k1, . . . , kd are the cyclic lifting values associated to the corresponding edges.

This resulting equation is equivalent to the Z parity checks in the cyclically lifted Tanner graph corresponding to the single associated parity check in the base graph. Thus, the parity check matrix for the lifted graph can be expressed using the matrix for the base graph in which 1 entries are replaced with monomials of the form xk and 0 entries are lifted as 0, but now the 0 is interpreted as the 0 binary polynomial modulo xz+1. Such a matrix may be written by giving the value k in place of xk. In this case the 0 polynomial is sometimes represented as "−1" and sometimes as another character in order to distinguish it from x0.

Figure 10:
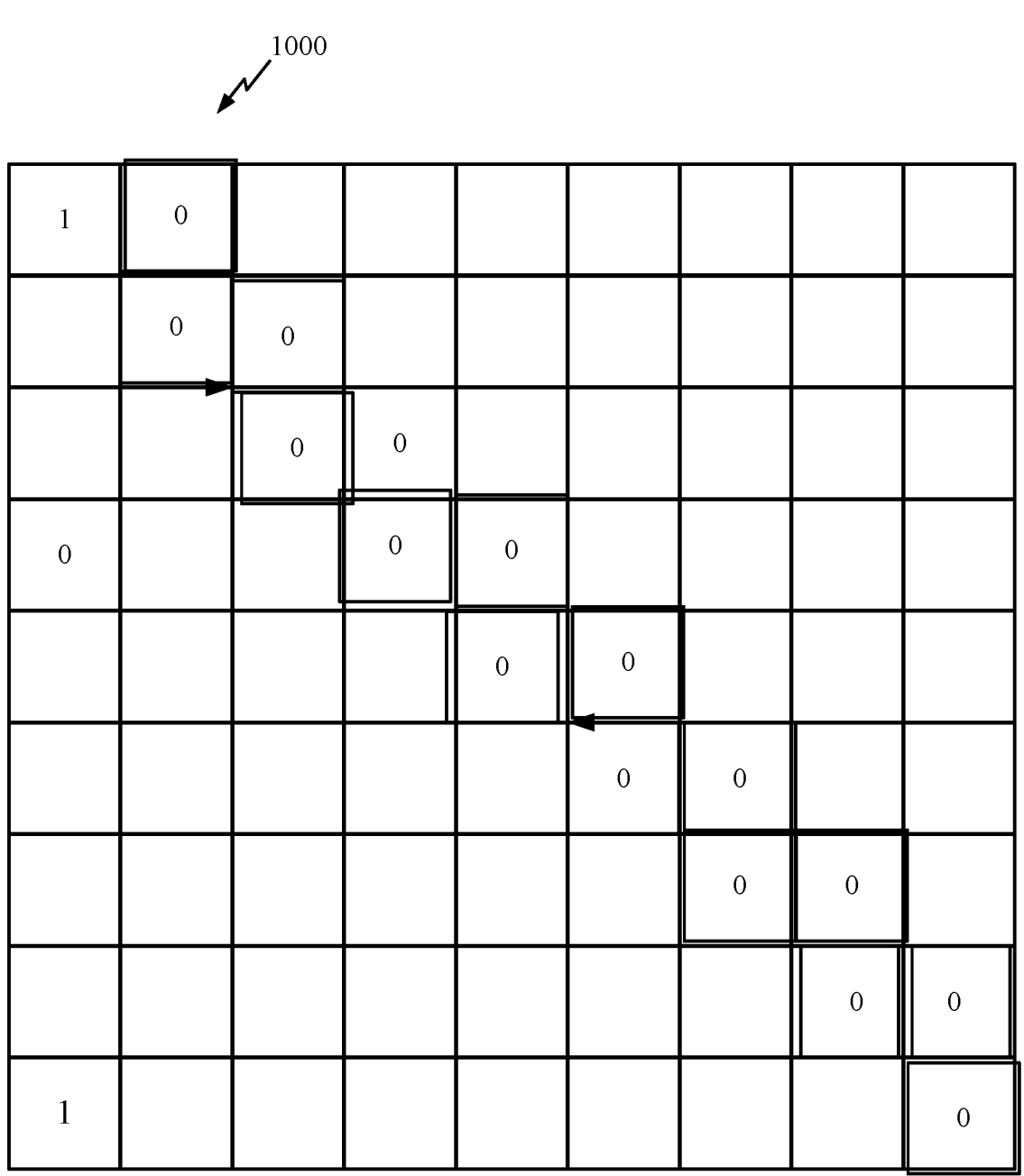
FIG. 10 is an integer representation of a matrix for a quasi-cyclic IEEE 802.11 LDPC code according to some aspects.

Typically, a square submatrix of the parity check matrix represents the parity bits of the code. The complementary columns correspond to information bits that, at the time of encoding, are set equal to the information bits to be encoded. The encoding may be achieved by solving for the variables in the aforementioned square submatrix in order to satisfy the parity check equations. The parity check matrix H may be partitioned into two parts M and N, where M is the square portion. Thus, encoding reduces to solving Mc=s=Nd where c and d comprise x. In the case of quasi-cyclic codes, or cyclically lifted codes, the above algebra can be interpreted as being over the ring of binary polynomials modulo xz+1. In the case of the IEEE 802.11 LDPC codes, which are quasi-cyclic, the encoding submatrix M has an integer representation as shown in FIG. 10.

A received LDPC codeword can be decoded to produce a reconstructed version of the original codeword. In the absence of errors, or in the case of correctable errors, decoding can be used to recover the original data unit that was encoded. Redundant bits may be used by decoders to detect and correct bit errors. LDPC decoder(s) generally operate by iteratively performing local calculations and passing those results by exchanging messages within the bipartite graph along the edges, and updating these messages by performing computations at the nodes based on the incoming messages. These steps may be repeated several times. For example, each variable node 810 in the graph 800 may initially be provided with a "soft bit" (e.g., representing the received bit of the codeword) that indicates an estimate of the associated bit's value as determined by observations from the communications channel. Using these soft bits the LDPC decoders may update messages by iteratively reading them, or some portion thereof, from memory and writing an updated message, or some portion thereof, back to, memory. The update operations are typically based on the parity check constraints of the corresponding LDPC code. In implementations for lifted LDPC codes, messages on like edges are often processed in parallel.

LDPC codes designed for high speed applications often use quasi-cyclic constructions with large lifting factors and relatively small base graphs to support high parallelism in encoding and decoding operations. LDPC codes with higher code rates (e.g., the ratio of the message length to the codeword length) tend to have relatively fewer parity checks. If the number of base parity checks is smaller than the degree of a variable node (e.g., the number of edges connected to a variable node), then, in the base graph, that variable node is connected to at least one of the base parity checks by two or more edges (e.g., the variable node may have a "double edge"). If the number of base parity checks is smaller than the degree of a variable node (e.g., the number of edges connected to a variable node), then, in the base graph, that variable node is connected to at least one of the base parity checks by two or more edges. Having a base variable node and a base check node connected by two or more edges is generally undesirable for parallel hardware implementation purposes. For example, such double edges may result in multiple concurrent read and write operations to the same memory locations, which in turn may create data coherency problems. A double edge in a base LDPC code may trigger parallel reading of the same soft bit value memory location twice during a single parallel parity check update. Thus, additional circuitry is typically needed to combine the soft bit values that are written back to memory, so as to properly incorporate both updates Eliminating double edges in the LDPC code helps to avoid this extra complexity.

LDPC code designs based on cyclic lifting can be interpreted, as codes over the ring of polynomials modulo may be binary polynomials modulo xZ−1, where Z is the lifting size (e.g., the size of the cycle in the quasi-cyclic code). Thus encoding such codes can often be interpreted as an algebraic operation in this ring.

In the definition of standard irregular LDPC code ensembles (degree distributions) all edges in the Tanner graph representation may be statistically interchangeable. In other words, there exists a single statistical equivalence class of edges. A more detailed discussion of lifted LDPC codes may be found, for example, in the book titled, "Modern Coding Theory," published Mar. 17, 2008, by Tom Richardson and Ruediger Urbanke. For multi-edge LDPC codes, multiple equivalence classes of edges may be possible. While in the standard irregular LDPC ensemble definition, nodes in the graph (both variable and constraint) are specified by their degree, i.e., the number of edges they are connected to, in the multi-edge type setting an edge degree is a vector; it specifies the number of edges connected to the node from each edge equivalence class (type) independently. A multi-edge type ensemble is comprised of a finite number of edge types. The degree type of a constraint node is a vector of (non-negative) integers; the i-th entry of this vector records the number of sockets of the i-th type connected to such a node. This vector may be referred to as an edge degree. The degree type of a variable node has two parts although it can be viewed as a vector of (non-negative) integers. The first part relates to the received distribution and will be termed the received degree and the second part specifies the edge degree. The edge degree plays the same role as for constraint nodes. Edges are typed as they pair sockets of the same type. The constraint that sockets must pair with sockets of like type characterizes the multi-edge type concept. In a multi-edge type description, different node types can have different received distributions (e.g., the associated bits may go through different channels).

Puncturing is the act of removing bits from a codeword to yield a shorter codeword. Thus, punctured variable nodes correspond to codeword bits that are not actually transmitted. Puncturing a variable node in an LDPC code creates a shortened code (e.g. due to the removal of a bit), while also effectively removing a check node. Specifically, for a matrix representation of an LDPC code, including bits to be punctured, where the variable node to be punctured has a degree of one (such a representation may be possible through row combining provided the code is proper), puncturing the variable node removes the associated bit from the code and effectively removes its single neighboring check node from the graph. As a result, the number of check nodes in the graph is reduced by one.

Figure 11:
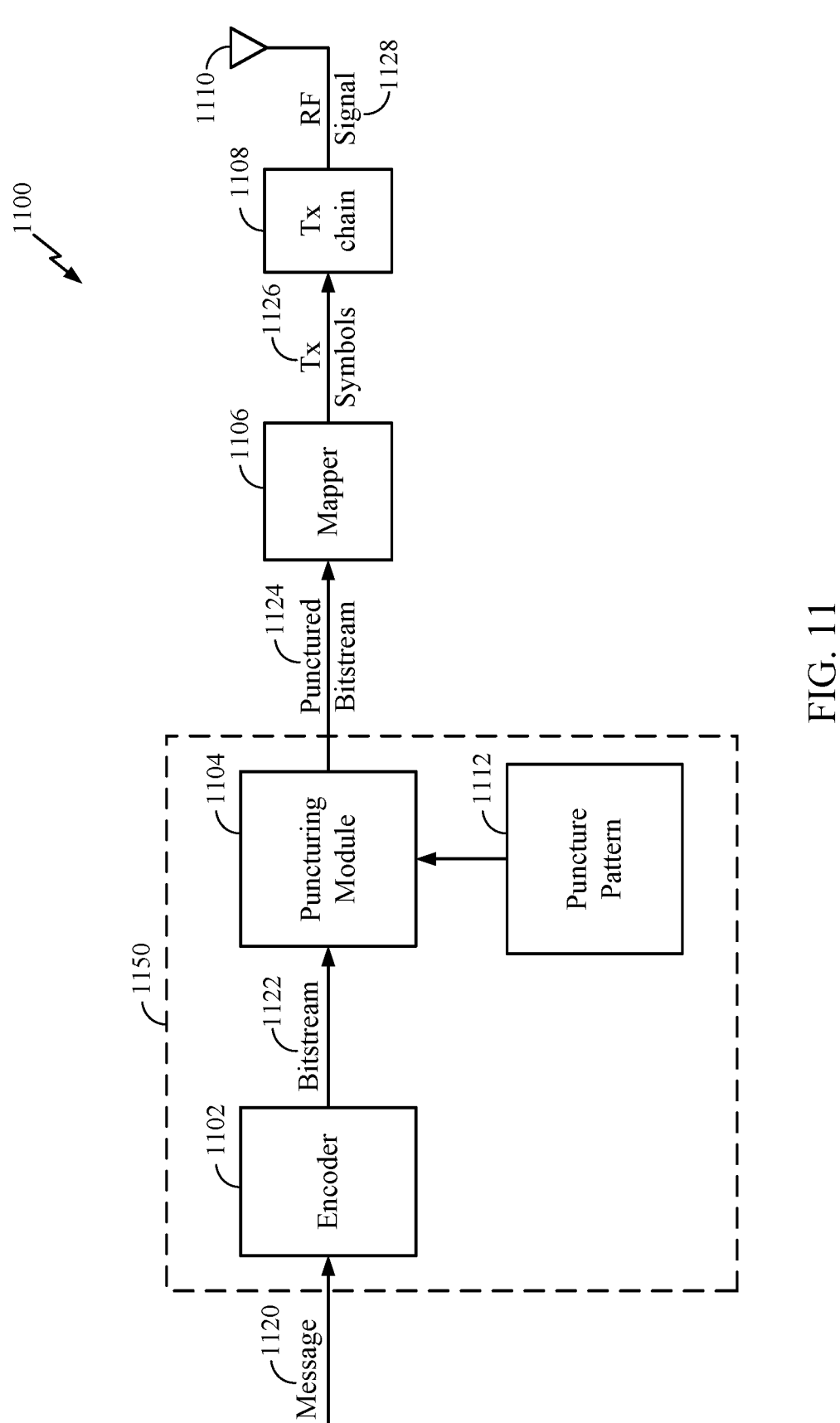
FIG. 11 is a simplified block diagram illustrating an example encoder, in accordance with certain aspects of the present disclosure.

FIG. 11 is a simplified block diagram illustrating an encoder, in accordance with certain aspects of the present disclosure. FIG. 11 is a simplified block diagram 1100 illustrating a portion of radio frequency (RF) modem 1150 that may be configured to provide a signal including an encoded message for wireless transmission. In one example, convolutional encoder 1102 in a BS 110 (or a UE 120 on the reverse path) receives message 1120 for transmission. Message 1120 may contain data and/or encoded voice or other content directed to the receiving device. Encoder 1102 encodes the message using a suitable modulation and coding scheme (MCS), typically selected based on a configuration defined by BS 110 or another network entity. Encoded bitstream 1122 produced by encoder 1102 may then be selectively punctured by puncturing module 1104, which may be a separate device or component, or which may be integrated with encoder 1102. Puncturing module 1104 may determine that bitstream 1122 should be punctured prior to transmission, or transmitted without puncturing. The decision to puncture bitstream 1122 is typically made based on network conditions, network configuration, RAN defined preferences and/or for other reasons. Bitstream 1122 may be punctured according to puncture pattern 1112 and used to encode message 1120. Puncturing module 1104 provides output 1124 to mapper 1106 that generates a sequence of Tx symbols 1126 that are modulated, amplified and otherwise processed by Tx chain 1108 to produce an RF signal 1128 for transmission through antenna 1110.

Output 1124 of puncturing module 1104 may be the unpunctured bitstream 1122 or a punctured version of the bitstream 1122, according to whether modem portion 1150 is configured to puncture the bitstream 1122. In one example, parity and/or other error correction bits may be punctured in output 1124 of encoder 1102 in order to transmit message 1120 within a limited bandwidth of the RF channel. In another example, the bitstream may be punctured to reduce the power needed to transmit message 1120, to avoid interference, or for other network-related reasons. These punctured codeword bits are not transmitted.

The decoders and decoding algorithms used to decode LDPC codewords operate by exchanging messages within the graph along the edges and updating these messages by performing computations at the nodes based on the incoming messages. Each variable node in the graph is initially provided with a soft bit, termed a received value, that indicates an estimate of the associated bit's value as determined by observations from, for example, the communications channel. Ideally, the estimates for separate bits are statistically independent. This ideal may be violated in practice. A received word is comprised of a collection of received values.

Figure 12:
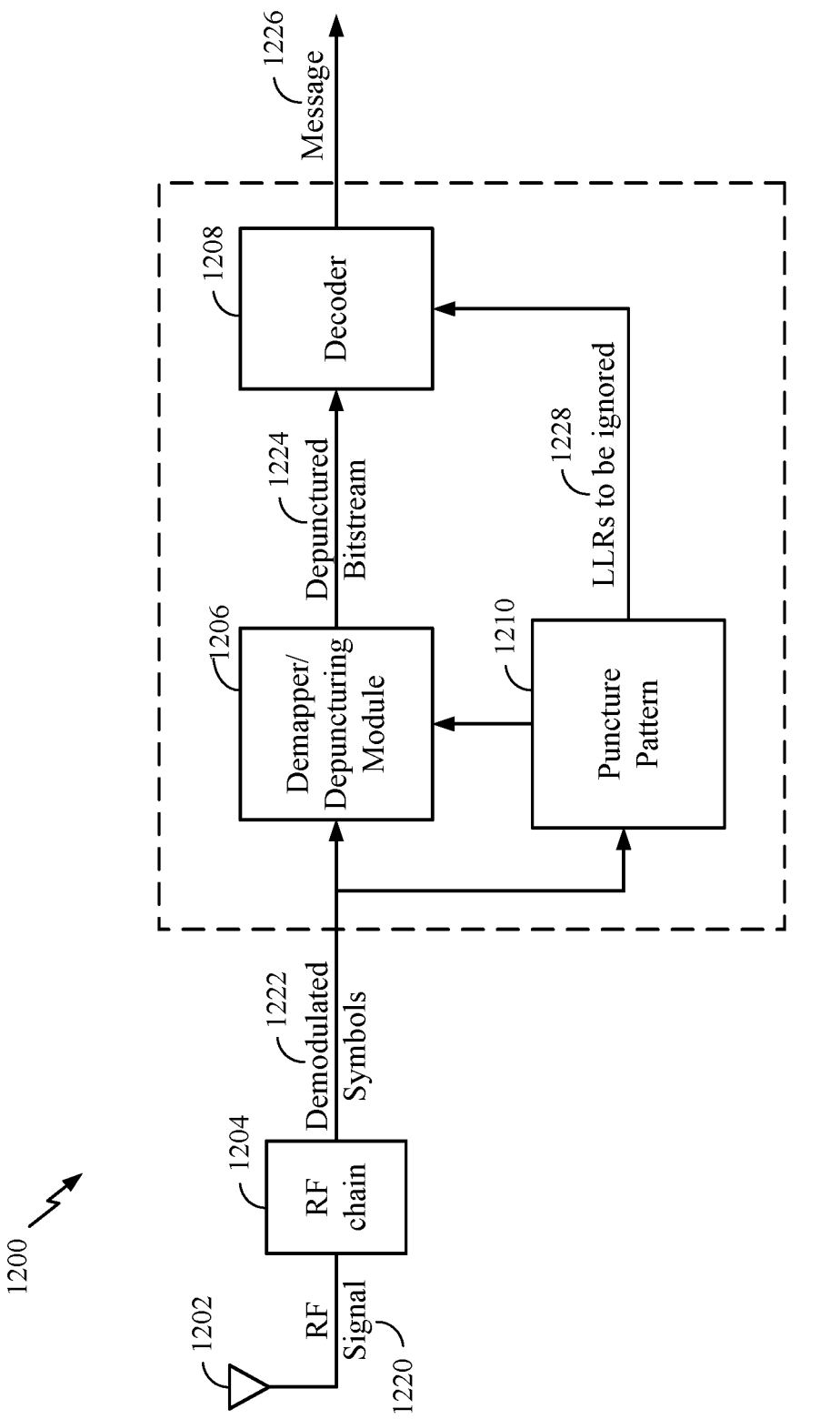
FIG. 12 is a simplified block diagram illustrating an example decoder, in accordance with certain aspects of the present disclosure.

FIG. 12 is a simplified block diagram illustrating a decoder, in accordance with certain aspects of the present disclosure. FIG. 12 is a simplified schematic 1200 illustrating a portion of a RF modem 1250 that may be configured to receive and decode a wirelessly transmitted signal including a punctured encoded message. The punctured codeword bits may be treated as erased. For example, the log-likelihood ratios (LLRs) of the punctured nodes may be set to 0 at initialization. De-puncturing may also include deshortening of shortened bits. These shortened bits are not included in a transmission and, at the receiver/decoder, shortened bits are treated as known bits. In various examples, modem 1250 receiving the signal may reside at the UE, at the BS, or at any other suitable apparatus or means for carrying out the described functions. Antenna 1202 provides an RF signal 1220 to a receiver. RF chain 1204 processes and demodulates RF signal 1220 and may provide a sequence of symbols 1222 to demapper 1226, which produces a bitstream 1224 representative of the encoded message.

Demapper 1206 may provide a depunctured bitstream 1224. In one example, demapper 1206 may include a depuncturing module that can be configured to insert null values at locations in the bitstream at which punctured bits were deleted by the transmitter. The depuncturing module may be used when the puncture pattern 1210 used to produce the punctured bitstream at the transmitter is known. Puncture pattern 1210 can be used to identify LLRs 1228 that may be ignored during decoding of bitstream 1224 by convolutional decoder 1208. The LLRs may be associated with a set of depunctured bit locations in the bitstream 1224. Accordingly, decoder 1208 may produce decoded message 1226 with reduced processing overhead by ignoring the identified LLRs 1228. The LDPC decoder may include a plurality of processing elements to perform the parity check or variable node operations in parallel. For example, when processing a codeword with lifting size Z, the LDPC decoder may utilize a number (Z) of processing elements to perform parity check operations on all edges of a lifted graph, concurrently.

Processing efficiency of decoder 1208 may be improved by configuring decoder 1208 to ignore LLRs 1228 that correspond to punctured bits in a message transmitted in a punctured bitstream 1222. The punctured bitstream 1222 may have been punctured according to a puncturing scheme that defines certain bits to be removed from an encoded message. In one example, certain parity or other error-correction bits may be removed. A puncturing pattern may be expressed in a puncturing matrix or table that identifies the location of bits to be punctured in each message. A puncturing scheme may be selected to reduce processing overhead used to decode the message 1226 while maintaining compliance with data rates on the communication channel and/or with transmission power limitations set by the network. A resultant punctured bitstream typically exhibits the error-correcting characteristics of a high rate error-correction code, but with less redundancy. Accordingly, puncturing may be effectively employed to reduce processing overhead at the decoder 1208 in the receiver when channel conditions produce a relatively high signal to noise ratio (SNR).

At the receiver, the same decoder used for decoding non-punctured bitstreams can typically be used for decoding punctured bitstreams, regardless of how many bits have been punctured. In conventional receivers, the LLR information is typically de-punctured before decoding is attempted by filling LLRs for punctured states or positions (de-punctured LLRs) with 0's. The decoder may disregard de-punctured LLRs that effectively carry no information based, at least in part, on which bits are punctured. The decoder may treat shortened bits as known bits (e.g., set to 0).

Example Low-Density Parity-Check Base Graph Selection for New Radio

NR standardization has introduced two low-density parity-check (LDPC) base graphs (BG1, BG2) from which an LDPC code may be derived for encoding data. On each slot transmission, one of the base graphs (BGs) is selected for usage, i.e., for deriving an LDPC code used to encode the transmission. The base graph (e.g., BG1 or BG2) used for the encoding is implicitly indicated by the code block size and code rate of the transmission.

In typical operation, a BS transmits a choice of modulation and coding scheme (MCS) and a resource allocation (RA) in downlink control information (DCI) corresponding to a data transmission (e.g., a codeword) that the BS is transmitting or will transmit. A UE receives the DCI and, if the DCI is intended for the UE, then the UE can determine a transport block size (TBS) for the data transmission based on the MCS and RA and according to a network specification. Upon determination of the TBS, the UE can determine the LDPC BG used to encode the data transmission based on values of the code block size and code rate implied by the TBS and RA. If the UE does not successfully receive the data transmission, then the BS may retransmit the data in a retransmission. For retransmissions, regardless of any new MCS and RA chosen for the retransmission, the BS encodes the data using the same BG as used for the original data transmission, and the UE selects the BG used in the original data transmission for decoding the retransmissions to ensure proper hybrid automatic retransmission request (HARM) combining and LDPC decoding of the combined transmissions (e.g., the original data transmission and any retransmissions).

When a BS sends a retransmission, the BS uses a same BG for deriving a code for encoding the retransmission as used for deriving a code for encoding the original data transmission, but the BS may choose a different MCS and RA than used in the original data transmission. While the MCS and RA for the retransmission are selected by the BS to ensure that the implied TBS of the retransmission is the same as the TBS used for the original data transmission, the code rate and, hence, the indicated base graph may change from the code rate and BG indicated for the original transmission. If the UE then decodes with the wrong BG, the data channel will not be correctly received.

According to aspects of the present disclosure, techniques are provided for a UE to determine the BG used in a retransmission in situations in which the UE misses (e.g., fails to properly decode, fails to receive) the control information for the original data transmission or the original data transmission.

FIG. 13 illustrates example operations 1300 for wireless communication, in accordance with certain aspects of the present disclosure. Operations 1300 may be performed, for example, by a base station (e.g., BS 110a shown in FIG. 1) comprising a processor in electrical communication with a memory, the processor configured to obtain data from the memory in preparation for wireless communications.

Operations 1300 begin, at block 1302, by the BS transmitting, by a transceiver circuit using one or more antenna elements in electrical communication with the transceiver circuit, a first codeword to a user equipment (UE), the first codeword encoded using a first low-density parity-check (LDPC) code derived from a base graph (BG) selected based on a code block size (CBS) and a first code rate of the transmission. For example, BS 110a transmits a first codeword to UE 120a, the first codeword encoded using a first LDPC code derived from a BG (e.g., BG1) selected (from a set of BG1 and BG2) based on a CBS and a first code rate of the transmission.

At block 1304, the BS obtains, by the transceiver circuit using the one or more antenna elements, an indication that the UE did not receive the first codeword. Continuing the example from above, the BS obtains an indication that the UE did not receive the first codeword, such as the BS not receiving an acknowledgment (ACK) of the first codeword from the UE.

At block 1306, the BS selects, by the processor, a second code rate for a retransmission of information bits of the first codeword, wherein the selection is from a restricted set of code rates designed to ensure the UE selects the same BG to decode the retransmission. Continuing the example, the BS selects a second code rate for a retransmission of information bits of the first codeword, wherein the selection is from a restricted set of code rates designed to ensure the UE selects the same BG (e.g., BG1 from the set of BG1 and BG2) to decode the retransmission.

At block 1308, the BS retransmits, by the transceiver circuit using the one or more antenna elements, the information bits in a second codeword according to the selected second code rate. Continuing the example from above, the BS retransmits the information bits in a second codeword according to the rate selected in block 1306.

According to aspects of the present disclosure, a BS may put a restriction on a code rate used for retransmissions, such that no ambiguity (e.g., ambiguity regarding which BG a UE should use in decoding the retransmissions) results. The operations 1300, described above with reference to FIG. 13, are an example of one technique for putting a restriction on a code rate used for retransmissions.

In aspects of the present disclosure, a mapping of code block size and/or code rate to BG choice (e.g., BG1 or BG2) may be initially specified, but a transmitting device (e.g., a BS) may restrict selection of code rates so that no ambiguity can result. For example, an initial mapping may indicate: choose BG2 if:

CBS is less than or equal to a first threshold (e.g., CBS≤292 bits);

code rate is less than or equal to a second threshold (e.g., code rate≤0.25); or CBS is less than or equal to a third threshold AND code rate is less than or equal to a fourth threshold (e.g., CBS≤3824 bits and code rate≤0.67);

otherwise, choose BG1.

In the example, for all original transmissions and retransmissions where the CBS is less than or equal to the third threshold (e.g., CBS≤3824 bits), the transmitting device (e.g., a BS) restricts the choice of MCS and/or RA on the original transmission and the retransmissions such that the code rate is always less than or equal to the fourth threshold (e.g., code rate≤0.67). Retransmissions will be guaranteed to have a same TBS sizing and therefore a same code block sizing. With the described additional restriction on code rate, choice of BG (e.g., BG1 or BG2) from which the receiving device is to derive an LDPC code to decode the retransmission becomes unambiguous. That is, a wireless device (e.g., a UE) that misses the original transmission and receives the retransmission will determine which BG to use based on the CBS and the code rate of the retransmission, and the transmitting device selects the MCS and/or RA for the original transmission and the retransmission such that the code rate for the original transmission and the retransmission always indicates the same BG (e.g., BG2).

FIG. 14 illustrates example operations 1400 for wireless communication, in accordance with certain aspects of the present disclosure. Operations 1400 may be performed, for example, by a base station (e.g., BS 110 shown in FIG. 1) comprising a processor in electrical communication with a memory, the processor configured to obtain data from the memory in preparation for wireless communications.

Operations 1400 begin, at block 1402, by the BS selecting, by the processor and based on a modulation and coding scheme (MCS) and a resource allocation (RA) for transmitting a codeword, a base graph (BG) stored in said memory, from which to derive a low density parity check (LDPC) code for use in encoding data bits in the codeword (e.g., encoding data bits of a bitstream such that some redundant bits are included in the codeword). For example, BS 110 selects, based on an MCS and a RA for transmitting a codeword, BG1 to derive an LDPC code for use in encoding data bits in the codeword.

At block 1404, the BS encodes, by an encoder circuit, the data bits to generate the codeword using the LDPC code derived from the selected BG. Continuing the example from above, the BS encodes the data bits to generate the codeword using the LDPC code derived from BG1.

At block 1406, the BS transmits, by a transceiver circuit, the codeword using the MCS via resources of the RA using one or more antenna elements in electrical communication with the transceiver circuit. Continuing the example from above, the BS transmits the codeword using the MCS via resources (e.g., time and frequency resources) of the RA.

FIG. 15 illustrates example operations 1500 for wireless communication, in accordance with certain aspects of the present disclosure. Operations 1500 may be performed, for example, by a user equipment (e.g., UE 120a shown in FIG. 1) comprising a processor in electrical communication with a memory, the processor configured to obtain data from the memory in preparation for wireless communications. Operations 1500 may be considered complementary to operations 1400, described above with reference to FIG. 14.

Operations 1500 begin, at block 1502, by the UE receiving, by a transceiver circuit using one or more antenna elements in electrical communication with the transceiver circuit, control information indicating a modulation and coding scheme (MCS) and a resource allocation (RA) for transmission of a codeword. For example, UE 120a receives control information (e.g., a DCI from BS 110a) indicating an MCS and an RA for transmission of a codeword.

At block 1504, the UE selects, by the processor and based on the MCS and the RA, a base graph (BG), from which to derive a low density parity check (LDPC) code for use in decoding the codeword. Continuing the example from above, the UE selects, based on the MCS and the RA indicated in the control information received in block 1502, BG1 to derive an LDPC code for use in decoding the codeword.

At block 1506, the UE receives, by the transceiver circuit using the one or more antenna elements, the codeword via resources of the RA. Continuing the example from above, the UE receives the codeword via resources (e.g., time and frequency resources) of the RA indicated in the control information received in block 1502.

At block 1508, the UE decodes, by a decoder circuit, the codeword using the LDPC code derived from the selected BG. Continuing the example from above, the UE decodes the codeword using the LDPC code derived from BG1.

According to aspects of the present disclosure, BSs and UEs of a communications system may explicitly ensure that each TBS size always maps to a same BG choice regardless of code block size and code rate, thus ensuring that there is no ambiguity in selecting a BG when a BS transmits and a UE receives a retransmission.

In aspects of the present disclosure, a BS may use a same set of criteria for choosing BG as previously described above, i.e. choose BG2 if CBS is less than or equal to a first threshold (e.g., CBS≤292 bits), if code rate is less than or equal to a second threshold (e.g., code rate≤0.25), or if CBS is less than or equal to a third threshold AND code rate is less than or equal to a fourth threshold (e.g., CBS≤3824 bits AND code rate≤0.67); otherwise choose BG1.

According to aspects of the present disclosure, the BS and UE in a wireless communications system may determine a mapping of TBS sizes from MCS and RA selections. The BS and UE may consider all possible TBS sizes and map each TBS size to a particular BG1 or BG2 selection, regardless of code block size and code rate. The BS and UE may override the BG choice from above (i.e., BG choice based on CBS and code rate) with the choice of BG based on the TBS size. For the case where only one MCS and RA combination produces a TBS size, then there is no need to override the BG choice based on MCS and RA.

FIG. 16 illustrates example operations 1600 for wireless communication, in accordance with certain aspects of the present disclosure. Operations 1600 may be performed, for example, by a base station (e.g., BS 110 shown in FIG. 1) comprising a processor in electrical communication with a memory, the processor configured to obtain data from the memory in preparation for wireless communications.

Operations 1600 begin, at block 1602, with the BS transmitting, by a transceiver circuit using one or more antenna elements in electrical communication with the transceiver circuit, control information indicating a base graph (BG) from which to derive a low density parity check (LDPC) code used in encoding bits of a codeword. For example, BS 110 transmits control information (e.g., a DCI) indicating (e.g., in a field of the DCI) the BS used BG1 to derive an LDPC code used in encoding bits of a codeword (e.g., a codeword transmitted using resources indicated in the DCI).

At block 1604, the BS encodes, by an encoder circuit, data bits to generate the codeword using the LDPC code derived from the selected BG. Continuing the example from above, the BS encodes data bits to generate the codeword using the LDPC code derived from BG1.

At block 1606, the BS transmits, by the transceiver circuit using the one or more antenna elements, the codeword. Continuing the example from above, the BS transmits the codeword.

FIG. 17 illustrates example operations 1700 for wireless communication, in accordance with certain aspects of the present disclosure. Operations 1700 may be performed, for example, by a user equipment (e.g., UE 120a shown in FIG. 1) comprising a processor in electrical communication with a memory, the processor configured to obtain data from the memory in preparation for wireless communications. Operations 1700 may be considered complementary to operations 1600, described above with reference to FIG. 16.

Operations 1700 begin, at block 1702, with the UE receiving, by a transceiver circuit using one or more antenna elements in electrical communication with the transceiver circuit, control information indicating a base graph (BG) from which to derive a low density parity check (LDPC) code used in encoding bits of a codeword. For example, UE 120a receives control information (e.g., a DCI) indicating (e.g., in a field of the DCI) BG1 to derive an LDPC code used in encoding bits of a codeword.

At 1704, the UE receives, by the transceiver circuit using the one or more antenna elements, the codeword. Continuing the example from above, the UE receives the codeword.

At block 1706, the UE decodes, by a decoder circuit, the codeword using the LDPC code derived from the selected BG. Continuing the example from above, the UE decodes the codeword received in block 1704 using the LDPC code derived from BG1.

According to aspects of the present disclosure, a BS may explicitly indicate a BG to use in decoding a transmission in a downlink control information (DCI). That is, a field and/or a bit in a DCI may directly indicate a BG to be used in decoding a data transmission scheduled by the DCI. Explicitly indicating a BG in a DCI clearly removes ambiguity, but at the expense of increasing control overhead in a wireless communications system.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for encoding, means for determining, means for selecting, and/or means for generating may include one or more processors, such as the TX MIMO processor 430, Transmit processor 420, and/or the Controller/Processor 440 of the BS 110 illustrated in FIG. 4; the TX MIMO processor 466, Transmit Processor 464, and/or the Controller/Processor 480 of the UE 120 illustrated in FIG. 4; and/or the encoder 1102 of the encoder 1100 illustrated in FIG. 11. Means for puncturing may comprise a processing system, which may include one or more of processors of FIG. 4, and/or the puncturing module 1104 of the encoder 1100 illustrated in FIG. 11. Means for transmitting includes a transmitter, which may include the Transmit processor 420, TX MIMO processor 430, modulator(s) 432a-432t, and/or the antenna(s) 434a-434t of the BS 110 illustrated in FIG. 4; the Transmit processor 464, TX MIMO Processor 466, modulator(s) 454a-454r, and/or antenna(s) 452a-452r of the UE 120 illustrated in FIG. 4; and/or the TX chain 1108 and antenna 1110 of the encoder 1100 illustrated in FIG. 11.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Program-mable Read-Only Memory), EPROM (Erasable Program-mable Read-Only Memory), EEPROM (Electrically Eras-able Programmable Read-Only Memory), registers, magnetic disks, optical disks, hard drives, or any other suitable storage medium, or any combination thereof. The machine-readable media may be embodied in a computer-program product.

A software module may include a single instruction, or many instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execu-tion of the software module, the processor may load some of the instructions into cache to increase access speed. One or more cache lines may then be loaded into a general register file for execution by the processor. When referring to the functionality of a software module below, it will be under-stood that such functionality is implemented by the proces-sor when executing instructions from that software module.

Also, any connection is properly termed a computer-readable medium. For example, if the software is transmitted from a website, server, or other remote source using a coaxial cable, fiber optic cable, twisted pair, digital sub-scriber line (DSL), or wireless technologies such as infrared (IR), radio, and microwave, then the coaxial cable, fiber optic cable, twisted pair, DSL, or wireless technologies such as infrared, radio, and microwave are included in the defi-nition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or oth-erwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method in a user equipment (UE), the method comprising:
   receiving control information indicating a modulation and coding scheme (MCS) and a resource allocation (RA) for reception of a codeword;
   determining a code rate based on the MCS;
   selecting a first base graph (BG) from which to derive a low density parity check (LDPC) code for use in decoding the codeword for an original transmission, wherein the selecting is based on the code rate and the RA;
   receiving a retransmission of the codeword;
   selecting a second BG for use in decoding the retrans-mission based at least on a second code rate, wherein the second code rate is restricted; and
   decoding the retransmission based on the second BG.

2. The method of claim 1, wherein selecting the first BG comprises selecting the first BG from a set of two base graphs.

3. The method of claim 1, wherein the second BG is the same as the first BG selected for the original transmission.

4. The method of claim 1, wherein the selecting the first BG further comprises:
   selecting a transport block size (TBS) based on the MCS and the RA; and
   selecting the first BG based on the TBS and the code rate.

5. The method of claim 1, wherein a transport block size (TBS) of the retransmission is the same as a TBS of the original transmission.

6. The method of claim 1, wherein each of a plurality of transport block sizes (TBSs) is mapped to a selection of a BG.

7. An apparatus for wireless communications, compris-ing:
   a memory; and
   one or more processors coupled with the memory and configured to cause the apparatus to:
   receive control information indicating a modulation and coding scheme (MCS) and a resource allocation (RA) for reception of a codeword;
   determine a code rate based on the MCS;
   select a first base graph (BG) from which to derive a low density parity check (LDPC) code for use in decoding the codeword for an original transmission, wherein the selecting is based on the code rate and the RA;
   receive a retransmission of the codeword;
   select a second BG for use in decoding the retransmission based at least on a second code rate, wherein the second code rate is restricted; and
   decode the retransmission based on the second BG.

8. The apparatus of claim 7, wherein the one or more processors further cause the apparatus to select the first BG from a set of two base graphs.

9. The apparatus of claim 7, wherein the second BG is the same as the first BG selected for the original transmission.

10. The apparatus of claim 7, wherein the one or more processors further cause the apparatus to:

select a transport block size (TBS) based on the MCS and RA; and select the first BG based on the TBS and the code rate.

11. The apparatus of claim 7, wherein a transport block size (TBS) of the retransmission is the same as a TBS of the original transmission.

12. The apparatus of claim 7, wherein each of a plurality of transport block sizes (TBSs) is mapped to a selection of a BG.

\*    \*    \*    \*    \*